United States Patent
Sperry et al.

(10) Patent No.: US 6,253,806 B1
(45) Date of Patent: Jul. 3, 2001

(54) INFLATABLE PACKING MATERIAL AND INFLATION SYSTEM

(75) Inventors: Laurence B. Sperry, Brighton; Jesse S. Drake, Maynard, both of MA (US)

(73) Assignee: Sealed Air Corporation, Danbury, CT (US)

( * ) Notice: Subject to any disclaimer, the term of this patent is extended or adjusted under 35 U.S.C. 154(b) by 0 days.

(21) Appl. No.: 09/140,522

(22) Filed: Aug. 26, 1998

Related U.S. Application Data

(63) Continuation-in-part of application No. 09/059,791, filed on Apr. 13, 1998.

(51) Int. Cl.$^7$ .................................................. B65B 1/04
(52) U.S. Cl. ........................ 141/314; 141/313; 141/10; 141/114; 410/119
(58) Field of Search ..................... 141/114, 313, 141/314, 315, 316, 317, 6, 94; 53/139.5; 410/119, 125; 137/557, 551

(56) References Cited

U.S. PATENT DOCUMENTS

| | | |
|---|---|---|
| 383,964 | 6/1888 | MacKintosh . |
| 1,213,518 | 1/1917 | McEwen . |
| 2,530,504 | 11/1950 | Boyer . |
| 3,398,501 | 8/1968 | Aninger . |
| 3,514,157 | 5/1970 | Geiser . |
| 3,733,005 | 5/1973 | Frieder, Jr. . |
| 3,808,981 | 5/1974 | Shaw . |
| 3,877,719 | 4/1975 | Lewis et al. . |
| 3,889,743 | 6/1975 | Presnick . |
| 3,891,082 | 6/1975 | Fall . |
| 4,146,069 | 3/1979 | Angarola et al. . |
| 4,146,070 | 3/1979 | Angarola et al. . |
| 4,215,778 | 8/1980 | Kovins . |
| 4,240,556 | 12/1980 | Field . |
| 4,262,801 | 4/1981 | Avery . |
| 4,267,684 | 5/1981 | Ambrose . |
| 4,465,188 | 8/1984 | Soroka et al. . |
| 4,489,833 | 12/1984 | Bauer . |
| 4,569,082 | 2/1986 | Ainsworth et al. . |
| 4,573,202 | 2/1986 | Lee . |
| 4,597,244 | 7/1986 | Pharo . |
| 4,640,080 | 2/1987 | Wright . |
| 4,793,123 | 12/1988 | Pharo . |

(List continued on next page.)

FOREIGN PATENT DOCUMENTS

| | | |
|---|---|---|
| 40 30 919 A1 | 4/1991 | (DE) . |
| 1253325 | 1/1961 | (FR) . |
| 2 073 269 | 1/1971 | (FR) . |
| 2456677 | 12/1980 | (FR) . |
| 47-46063 | 12/1972 | (JP) . |
| 51-58774 | 5/1976 | (JP) . |
| 64-23488 | 2/1989 | (JP) . |
| 10-129730 | 5/1998 | (JP) . |
| 10-129731 | 5/1998 | (JP) . |
| 85/00151 | 1/1985 | (WO) . |
| 98/14390 | 4/1998 | (WO) . |

OTHER PUBLICATIONS

Inflatable Packaging Incorporated product brochure (no date).
Impackt, L.L.C. product brochure (no date).
Sealed Air Corporation product brochure (Vistaflex), (no date).
Sealed Air Corporation product brochure (VoidPak), (no date).

*Primary Examiner*—Steven O. Douglas
(74) *Attorney, Agent, or Firm*—Fish & Richardson P.C.

(57) ABSTRACT

A method of inflating a dunnage bag in a box including the steps of inflating the dunnage bag; with one or more sensors, monitoring deflection of at least two surfaces of the box while inflating the dunnage bag; upon detecting through monitoring that deflection of either of at least two surfaces reaches a corresponding preseleted threshold, automatically terminating inflating of the box.

14 Claims, 19 Drawing Sheets

U.S. PATENT DOCUMENTS

| | | |
|---|---|---|
| 4,872,558 | 10/1989 | Pharo . |
| 4,874,093 | 10/1989 | Pharo . |
| 4,877,334 | 10/1989 | Cope . |
| 4,892,124 | 1/1990 | Thomsen . |
| 4,905,835 | 3/1990 | Pivert et al. . |
| 4,917,646 | 4/1990 | Kieves . |
| 4,918,904 | 4/1990 | Pharo . |
| 4,966,185 | 10/1990 | Schram . |
| 5,022,527 | 6/1991 | Braeutigam . |
| 5,042,541 | 8/1991 | Krier et al. . |
| 5,056,558 * | 10/1991 | Rodgers et al. ............... 137/552 |
| 5,121,840 | 6/1992 | Schram . |
| 5,240,135 | 8/1993 | Lepinoy . |
| 5,272,856 | 12/1993 | Pharo . |
| 5,275,290 | 1/1994 | BierfrEund . |
| 5,288,188 | 2/1994 | Vance . |
| 5,335,486 | 8/1994 | Davis . |
| 5,339,602 * | 8/1994 | Landers et al. ............... 53/410 |
| 5,397,000 | 3/1995 | Holte et al. . |
| 5,454,407 * | 10/1995 | Huza et al. ............... 141/10 |
| 5,454,642 | 10/1995 | De Luca . |
| 5,552,003 | 9/1996 | Hoover et al. . |
| 5,651,237 | 7/1997 | De Luca . |
| 5,806,572 * | 9/1998 | Voller ............... 141/10 |
| 5,901,850 | 5/1999 | Jones et al. . |

\* cited by examiner

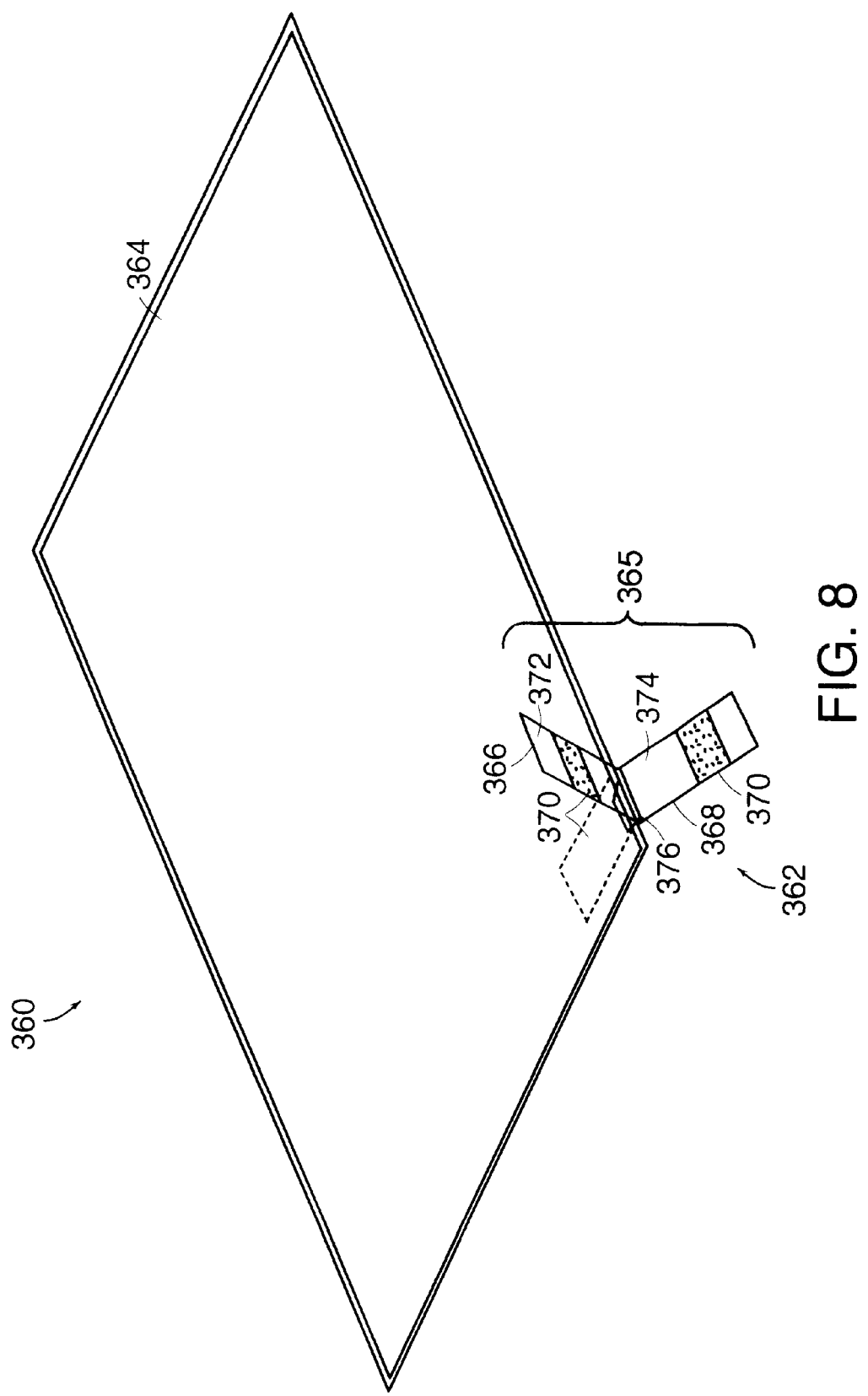

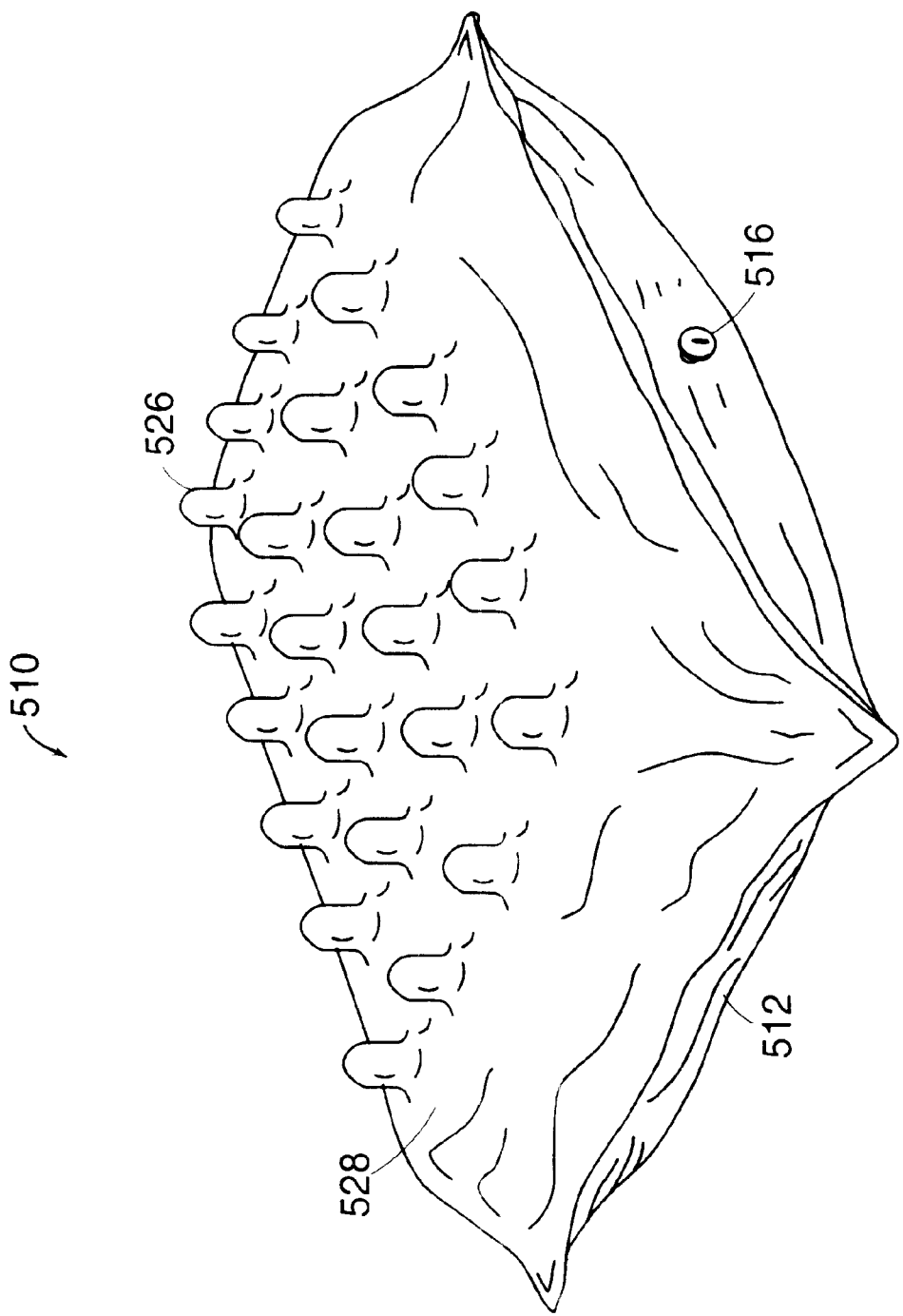

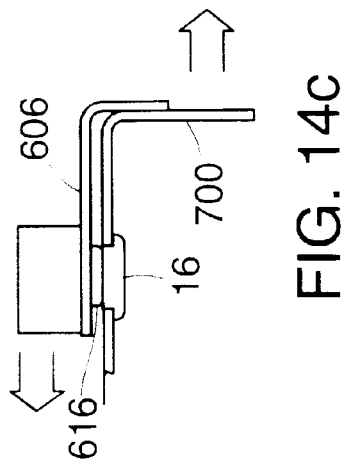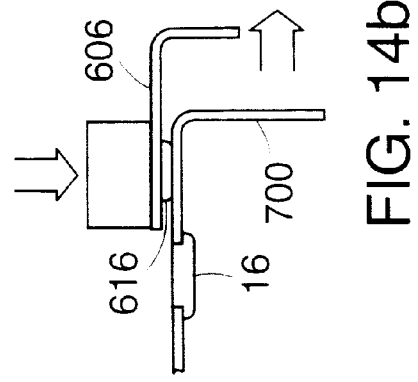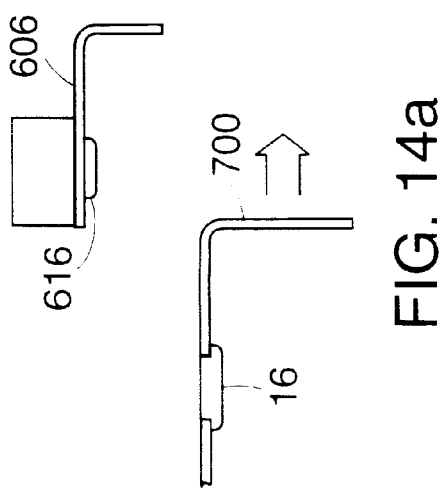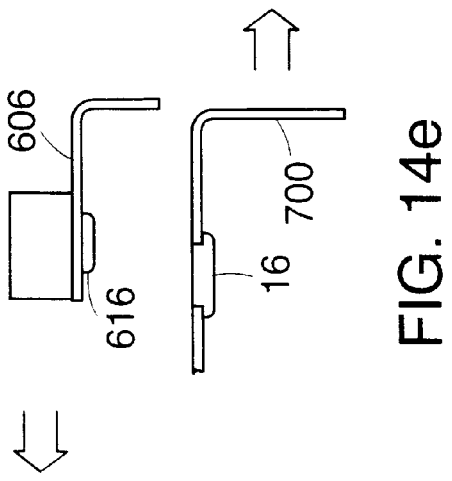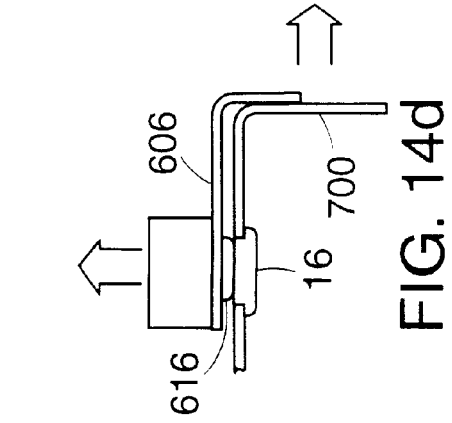

INFLATABLE PACKING MATERIAL AND INFLATION SYSTEM

CROSS-REFERENCE TO RELATED APPLICATION(S)

This application is a continuation-in-part of application Ser. No. 09/059,791, filed Apr. 13, 1998, now pending.

BACKGROUND OF THE INVENTION

This invention relates to a system and method for inflating inflatable packing material, in particular dunnage air bags.

Dunnage air bags are typically used to fill void regions in containers carrying articles for shipment. When the bag is inflated, the article is wedged between the bag and the walls of the container or between portions of the bag. Thus the article is prevented from moving around in the container while being shipped. The bag is usually made from a puncture resistant material to ensure that the bag remains inflated during the shipment of the article.

SUMMARY OF THE INVENTION

In general, in one aspect, the invention is a method of inflating a dunnage bag in a box. The method includes the steps of inflating the dunnage bag; with one or more sensors, monitoring deflection of at least two surfaces of the box while inflating the dunnage bag; upon detecting through monitoring that deflection of either of the at least two surfaces reaches a corresponding preseleted threshold, automatically terminating inflating of the box.

In preferred embodiments, the at least two surfaces include the top of the box and one side of the box.

In general, in another aspect, the invention is an inflation system for inflating a dunnage bag in a box, wherein the dunnage bag has a valve mounted in the side of the box. The system includes a conveyor which moves the box through the system; an inflation nozzle; an alignment guide which is attached to the inflation nozzle and which has at least two alignment surfaces, each for a corresponding different surface of the box; and a positioning mechanism which controls movement of the alignment guide and which during operaton automatically moves the alignment guide into contact with the box so that the at least two alignment surfaces are in contact with their corresponding surfaces of the box thereby aligning the inflation nozzle with the valve in the box.

Preferred embodiments include the following features. The alignment guide is a L-shaped member having a first arm defining one of the at least two alignment surfaces and a second arm defining another one of the at least two alignment surfaces.

In general, in still another aspect, the invention is an automatic inflation system for inflating a dunnage bag in a box, wherein the dunnage bag has a valve mounted in the side of the box. The system includes an inflation nozzle through which gas is flowed into the dunnage bag through the valve; a controller which controls the inflation process; a vertical bulge detector which during operation generates a first signal that provides a measure of bulge of the top of the box; and a horizontal bulge detector which during operation generates a second signal that provides a measure of bulge of a side of the box; wherein the controller receives signals from the vertical and horizontal bulge detectors and is programmed to control the inflation process in response thereto.

Also, in preferred embodiments, the controller stores a first threshold and a second threshold and is programmed to perform the operations of: comparing the measure of the bulge of the top surface to the first threshold; comparing the measure of the bulge of the the side surface to the second threshold; and if the either measure of bulge becomes at least as large as the corresponding threshold, terminating the inflation process. Alternatively, the controller stores a first threshold, a second threshold and a third threshold and is programmed to perform the operations of: comparing the measure of the bulge of the top surface to the first threshold; comparing the measure of the bulge of the side surface to the second threshold; combining the measures of bulge of the top and side surfaces to generate a combined measure of bulge; and if any of the measures of bulge becomes at least as large as the corresponding threshold, terminating the inflation process.

In preferred embodiments the controller stores a table mapping box sizes to first and second threshold values, and wherein the controller is further programmed to perform the operations of: from the signals of at least one of the horizontal and vertical bulge detectors, determine a box size; and selecting values for the first and second thresholds from the table based on the box size.

In general, in still yet another aspect, the invention is a method of inflating a dunnage bag in a box. The method includes inflating the dunnage bag; monitoring deflection of the top of the box while inflating the dunnage bag; upon detecting through monitoring that deflection of the top surface reaches a preseleted threshold, automatically terminating inflating of the box.

Other features and advantages of the invention will become apparent from the following detailed description and from the claims.

BRIEF DESCRIPTION OF THE DRAWINGS

FIG. 8 is an illustration of yet another alternative embodiment of a dunnage bag incorporating a flexible valve assembly;

FIG. 12A is an illustration of another alternative embodiment of a dunnage bag with protrusions.

FIGS. 14a–e illustrate the operation of the system shown in FIG. 13.

DESCRIPTION OF THE PREFERRED EMBODIMENTS

Figure 1:
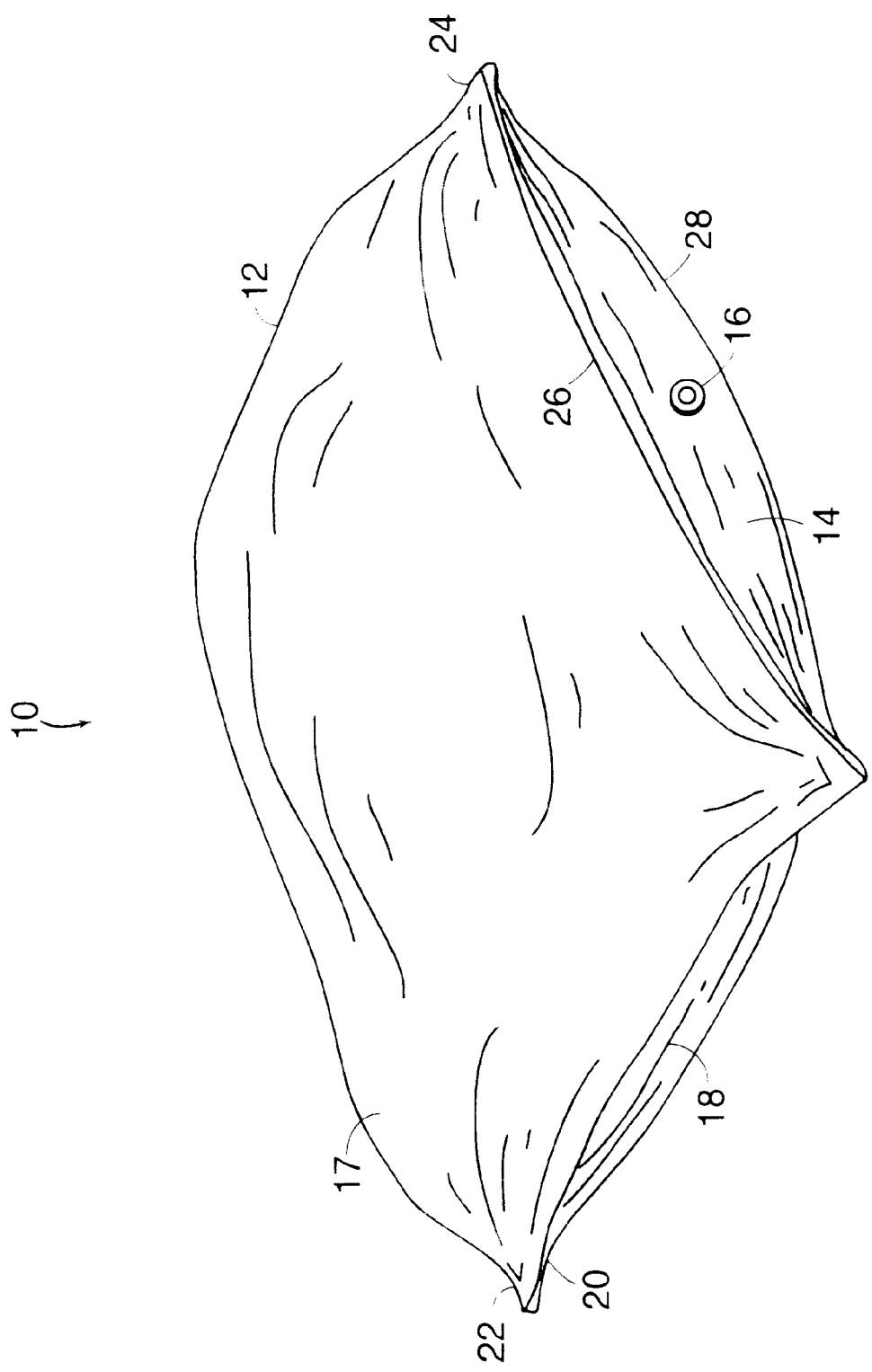
FIG. 1 is an illustration of a dunnage bag incorporating a rigid valve assembly.

Referring to FIG. 1, a dunnage bag 10 includes a flexible bag 12 with a pleat 14, and a rigid valve assembly 16 mounted in the pleat. Two opposed sides 17, 18 of flexible bag 12 are sealed along three edges 20, 22, 24, and pleat 14 is sealed along a pair of edges 26, 28 with opposed sides 17, 18, respectively. Pleat 14 is a folded piece of material that unfolds when dunnage bag 10 is inflated to provide increased volume expansion of the bag. Side 18 also includes a fold (not shown) that unfolds to provide further volume expansion of bag 10 when the bag is inflated.

Flexible bag 12 is typically made from a pliable, sealable material, for example linear, low density polyethylene. Flexible bag 12 can also be made from other materials including medium or high density polyethylene. Flexible bag 12 can also include a polyester or nylon outer layer, for strength and abrasion resistance, and a low-density polyethylene inner bag for heat sealability.

Figure 2A:
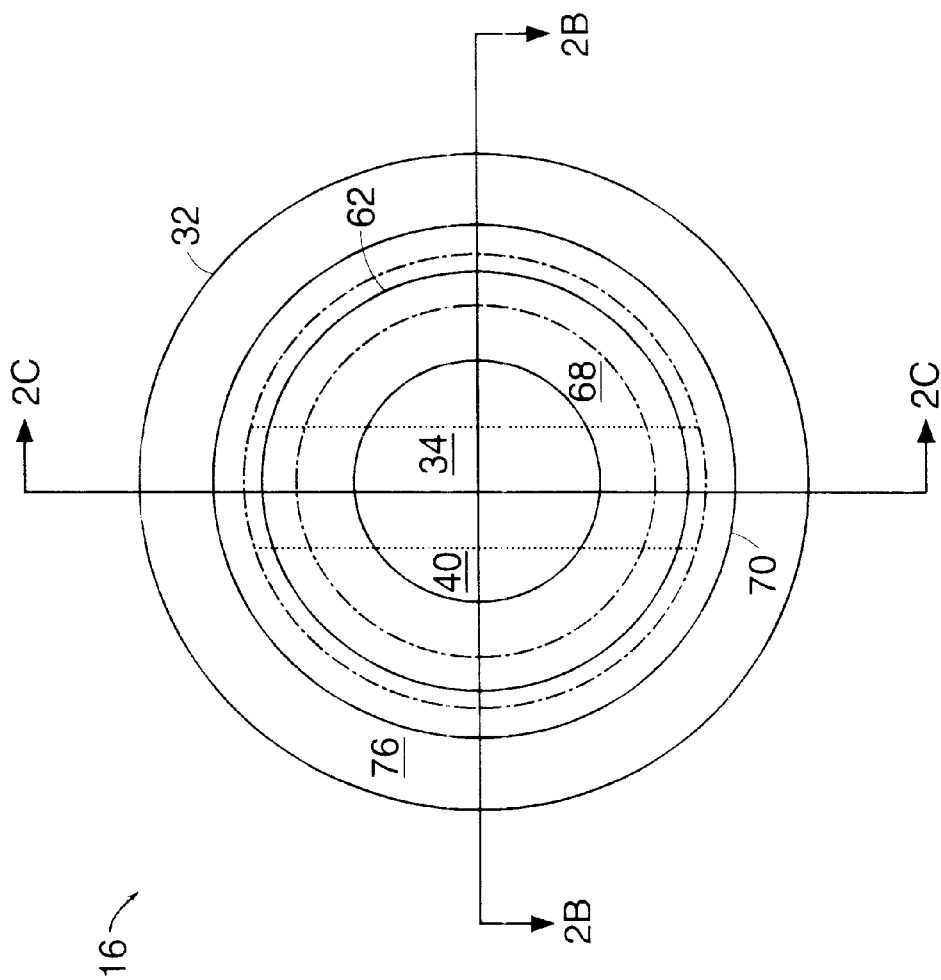
FIG. 2A is a front view of the rigid valve assembly of the dunnage bag of FIG. 1.
Figure 2B:
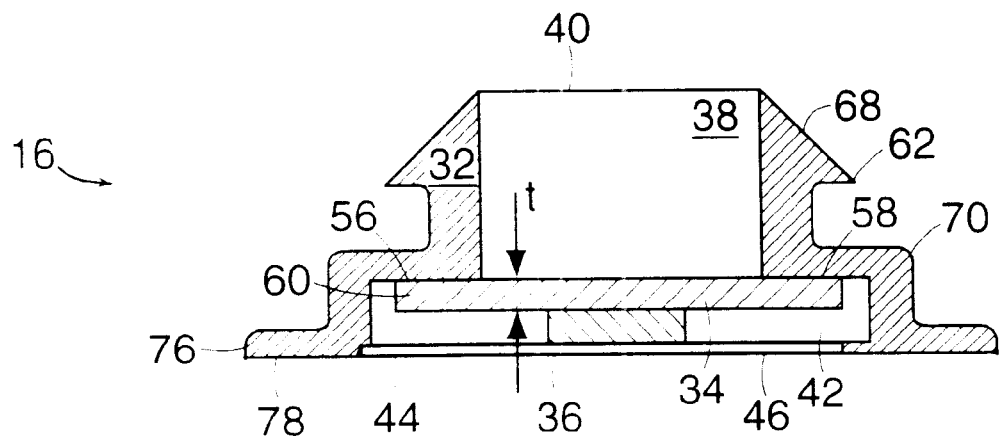
FIG. 2B is a side cross-sectional view along line 2B—2B of FIG. 2A.
Figure 2C:
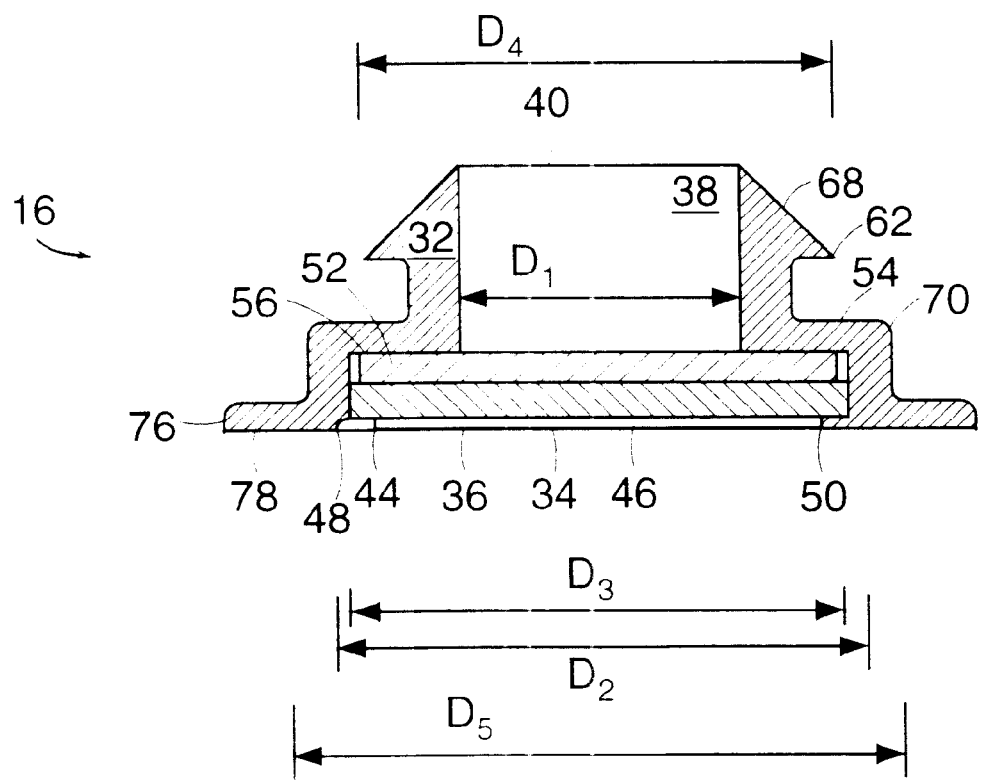
FIG. 2C is a side cross-sectional view along line 2C—2C of FIG. 2A.

Referring to FIGS. 2A–2C, rigid valve assembly 16 includes a housing 32, and a circular diaphragm 34 secured within housing 32 by a retainer post 36. Housing 32 defines a bore 38 which extends from an entrance opening 40 of housing 32 to an enlarged bore 42 located at the other end of the housing. A circular ledge 44 extends inwardly into enlarged bore 42 and defines an exit opening 46. Retainer post 36 includes two ends 48, 50 engaged with ledge 44 of housing 32 such that two outer portions 52, 54 of diaphragm 34 are held against a surface 56 of housing 32 to hold diaphragm 34 within housing 32. Diaphragm 34 includes two side portions 58, 60 located on either side of retainer post 36. Portions 58, 60 of diaphragm 34 mate up against surface 56 of housing 32 to form a seal, when flexible bag 12 is inflated to about 2 to 3 psi. Housing 32 includes an outwardly extending rim 62 which has a tapered surface 68, and an outwardly extending shoulder 70 spaced from rim 62. Shoulder 70 is larger in diameter than rim 62. A base portion 76 of housing 32 includes another surface 78 which is adhered to flexible bag 12.

In the embodiment of the valve assembly illustrated in FIGS. 2A–2C, bore 38 has a diameter, $D_1$, of about 0.3 inch. The diameter, $D_2$, of enlarged bore 38 is about 0.6 inch, and exit opening 46 defined by circular ledge 44 has a diameter, $D_3$, of about 0.55 inch. Rim 62 has an outer diameter, $D_4$, of about 0.5 inch, and shoulder 70 has an outer diameter $D_5$ of about 0.7 inch.

Housing 32 is made from the same material as flexible bag 12 to facilitate heat sealing housing 32 to flexible bag 12 by, for example, ultrasonic welding. Diaphragm 34 is made from chlorofluro-silicon having a thickness, t, of about 0.010 inch. Diaphragm 34 can also be made from other suitable materials which have a memory which causes portions 56, 58 of diaphragm 34 to spring back, after inflation, and abut against surface 56 to form a seal. The Shore A durometer of the diaphragm ranges between 30 and 60 so that the diaphragm is soft enough to ensure proper sealing between diaphragm 34 and surface 56. A coat of oil, for example silicon, is typically applied to the surface of diaphragm 34 which is adjacent to surface 56 to enhance the sealing capabilities of the diaphragm. Retainer post 36 is typically made from Delrin™ or other suitable materials, including PVC and high density polyethylene to provide a desired stiffness to retainer post 36.

Figure 2D:
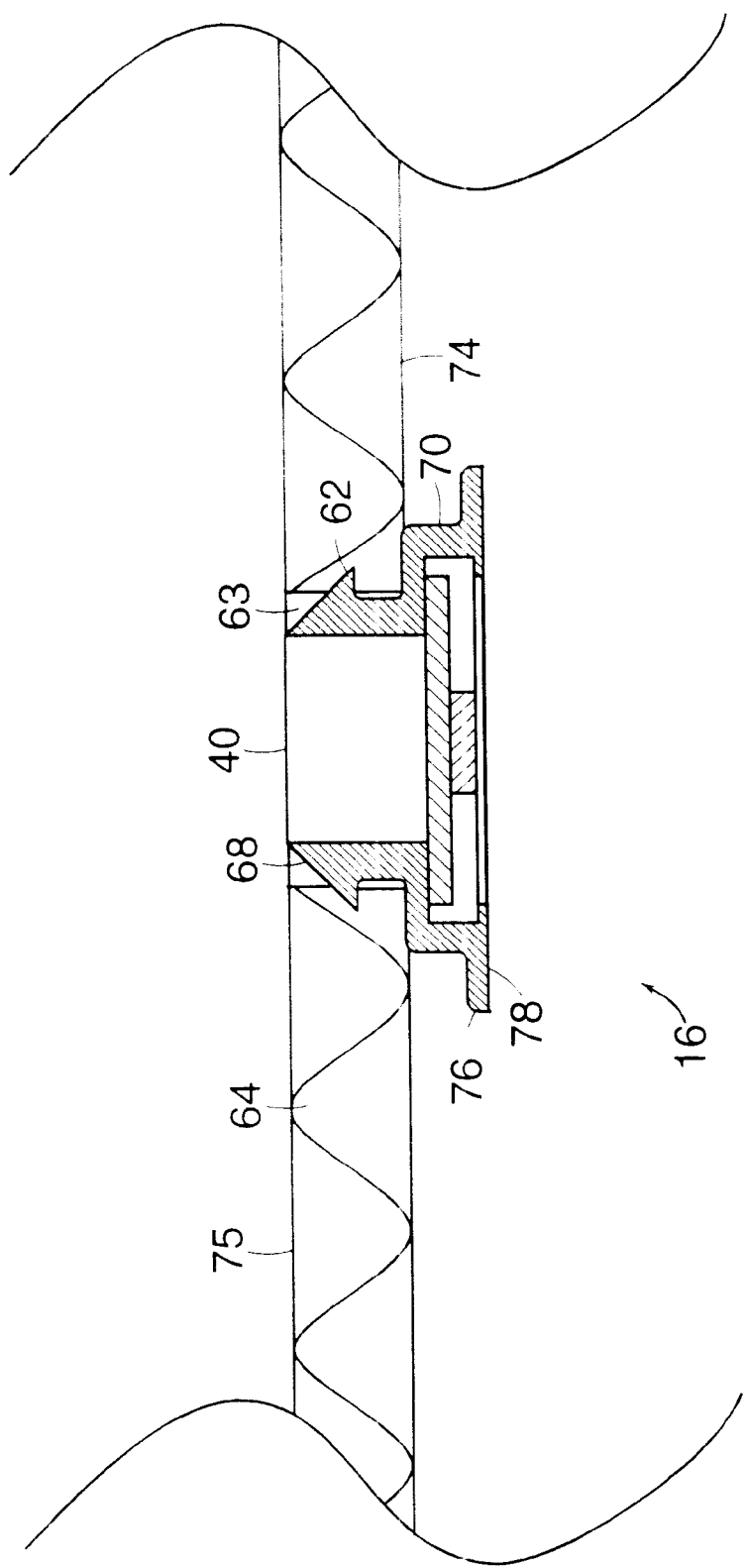
FIG. 2D is a side cross-sectional view of the rigid valve assembly of FIG. 2A mounted in an opening of a wall of a container.

In use, as shown in FIG. 2D, rim 62 of housing 32 engages with a wall 64 of a container 66 (FIG. 3) in an opening 63. Opening 63 is smaller in diameter than that of rim 62. Tapered surface 68 of rim 62 facilitates insertion of rigid valve assembly 16 into opening 63. In addition, tapered surface 68 helps form a seal with a fill nozzle 121 (FIG. 4B) during inflation of bag 12. Shoulder 70 of housing 32 abuts against an inner surface 74 of wall 64 to prevent rigid housing 32 from being pushed through wall 64 when rigid housing 32 is inserted into the wall. Contact of shoulder 70 of housing 32 with surface 74 of wall 64 provides tactile feedback to an operator that rigid valve assembly 16 is fully in place when snapped into the wall of the container. When rigid valve assembly 16 is mounted in opening 63, entrance opening 40 is flush with or recessed from an outer surface 75 of wall 64. In other words, entrance opening 40 does not protrude outwardly beyond outer surface 75. Rigid valve assembly 16 is used with containers having wall thicknesses which range from about 0.0625 inch to about 0.3 inch. Opening 63 typically has a diameter of about 0.375 inch.

Figure 3:
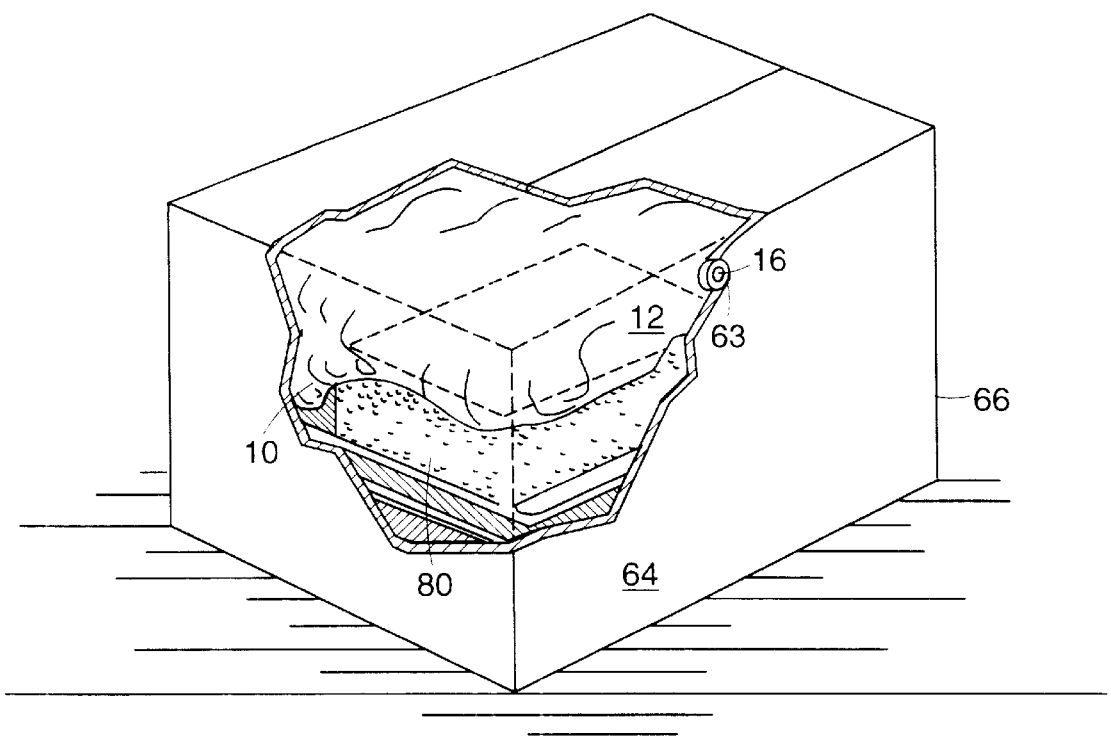
FIG. 3 is a perspective view of the dunnage bag of FIG. 1 in use in a container.

Referring to FIG. 3, dunnage bag 10 is shown fully inflated in container 66 holding several articles 80. Rigid valve assembly 16 is mounted in opening 63 in wall 64 of container 66. Rigid valve assembly 16 is located close to edge 28 (FIG. 1) of flexible bag 12 to allow pleat 26 (FIG. 1) to fully unfold to maximize the volume expansion of the bag so that the bag conforms about articles 80 carried within the container. Further, pleat 26 relieves the strain on flexible bag 12 near the region around rigid valve assembly 16. Dunnage bag 10 fills void regions within container 66 and wedges between articles 80 and the walls of container 66 to prevent these articles from moving within container 66 during shipment. Dunnage bag 10 is typically two to three inches larger in both width and length than that of container 66 to ensure that dunnage bag 10 properly fills the void regions about articles 80.

Figure 4A:
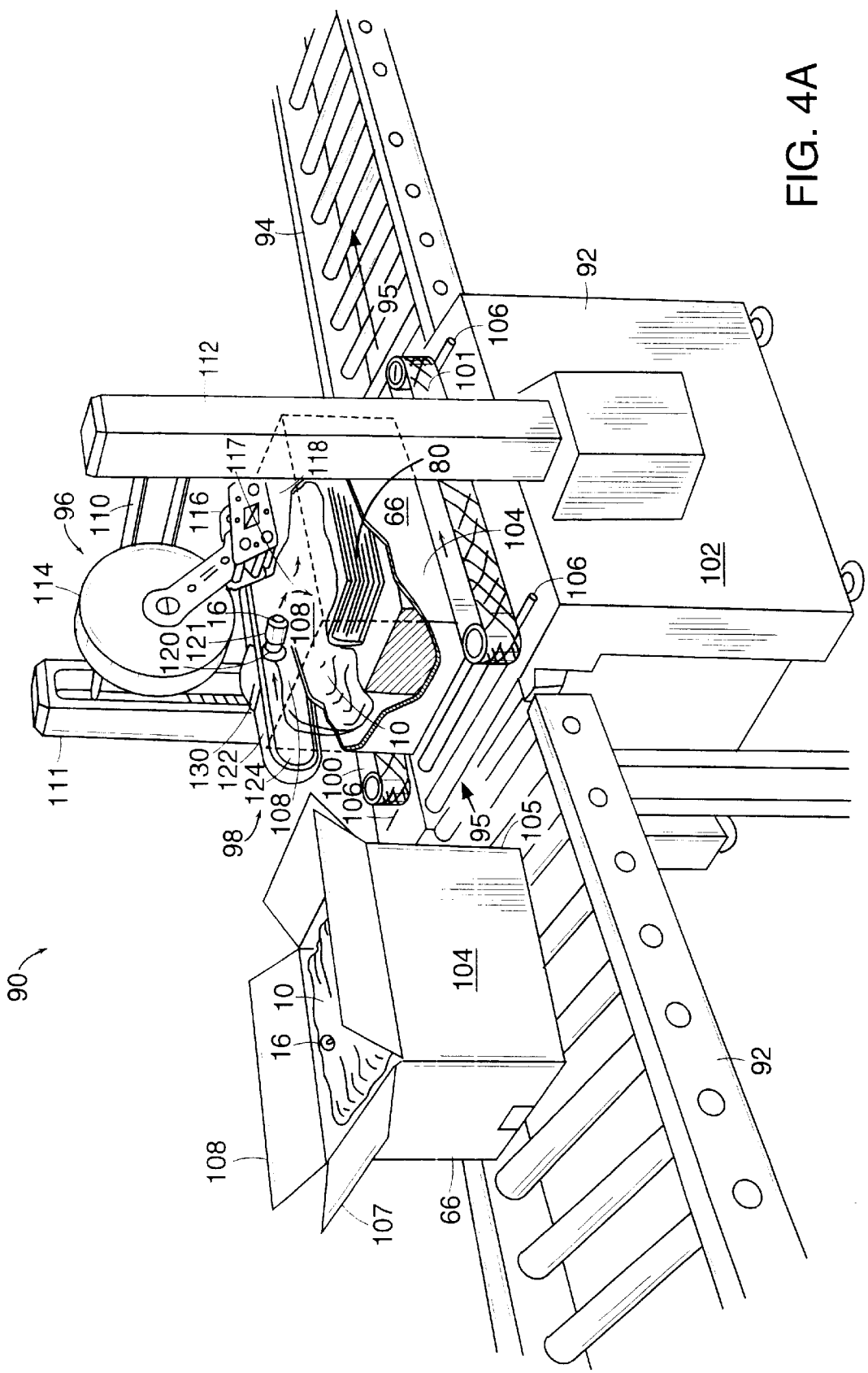
FIG. 4A is an illustration of a packaging system for inflating the dunnage bag of FIG. 1.

The following is a description of a system which automatically inflates the dunnage bag, and seals the container which holds the bag and articles for shipment. Referring to FIG. 4A, a packaging system 90 includes a pair of conveyors 92, 94 of a conveying system, and a taper/inflater station 97. Conveyor 92 transports container 66 in the direction of arrow 93 to station 97 after an operator mounts rigid valve assembly 16 in an opening of a wall of container 66, as shown in FIG. 2D. Next the operator folds a pair of minor flaps 107 and then a pair of major flaps 108 inward to a closed position. In station 97, a taper 96 seals the container and an inflating system 98 inflates dunnage bag 10. Conveyor 94 transports the packaged containers in the direction of arrow 95 away from station 97. A pair of belt drivers 100, 101 on either side of container 66 pulls the container through station 97. Each of belt drivers 100, 101 extend vertically from a base 102 of station 97, and are guided along a respective pair of slots 106. Belt drivers 100, 101 pneumatically push against a pair of vertical walls 104 (of which only one is shown) of container 66, thereby urging the walls inward to minimize a gap 117 at a top 118 of container 66 which is formed between major flaps 108 when the flaps are in a folded, closed position.

Taper 96 is supported on a cross bar 110 which is held by a pair of columns 111, 112 of station 97. Taper 96 includes a roll of tape 114 and a tape applying device 116. A sensor (not shown) detects the arrival and height of container 66, whereupon tape applying device 116 is pneumatically pushed by a pneumatic controller (not shown) against top 118 of container 66 with a predetermined force. As container 66 advances through station 97, tape applying device 116 applies a strip of tape along gap 117 to seal the container.

Inflating system 98 includes a pneumatically actuated arm 120 held in a housing 122 which is supported in column 111. Housing 122 is connected to cross bar 110 within column 111 so that housing 122 moves up and down along with tape applying device 116. The height of housing 122 and thus tape applying device 116 is pneumatically adjusted by the pneumatic controller. A fill nozzle 121 is held in arm 120 and is connected to a hose (not shown) which supplies compressed air to the fill nozzle. Fill nozzle 121 includes a pliable closed-cell foam end 126 (FIG. 4B) which sealably engages with entrance opening 40 of rigid valve assembly 16 during inflation of dunnage bag 10. Prior to the arrival of container 66 in station 97, arm 120 is urged rearward to a location 124 of housing 122. The speed of a motor (not shown) of belt drivers 100, 101 is monitored so that the precise speed of container 66 through station 97 is known. A sensor (not shown) positioned on station 97 determines a leading edge 105 of incoming container 66. The motor speed and the information from the sensors is used to determine the precise location of rigid valve assembly 16 when the valve assembly is mounted in opening 63 (FIG. 2D). In other words, the speed at which container 66 advances through station 97 and the location of leading edge 105 are known so that the precise time at which arm 120 pushes fill nozzle 121 against rigid valve assembly 16 is known. Thus, a predetermined time after leading edge 105 of container 66 is detected, arm 120 pushes fill nozzle 121 against rigid valve assembly 16 to begin the inflation sequence. Arm 120 is mounted on a mechanism which allows arm 120 to move forward in housing 122 with rigid valve assembly 16 as container 66 moves in the direction of arrow 130. After dunnage bag 10 is inflated, arm 120 and thus fill nozzle 121 are pulled away from rigid valve assembly 16. Arm 120 is then pneumatically urged rearward to location 124 of housing 122.

Figure 4B:
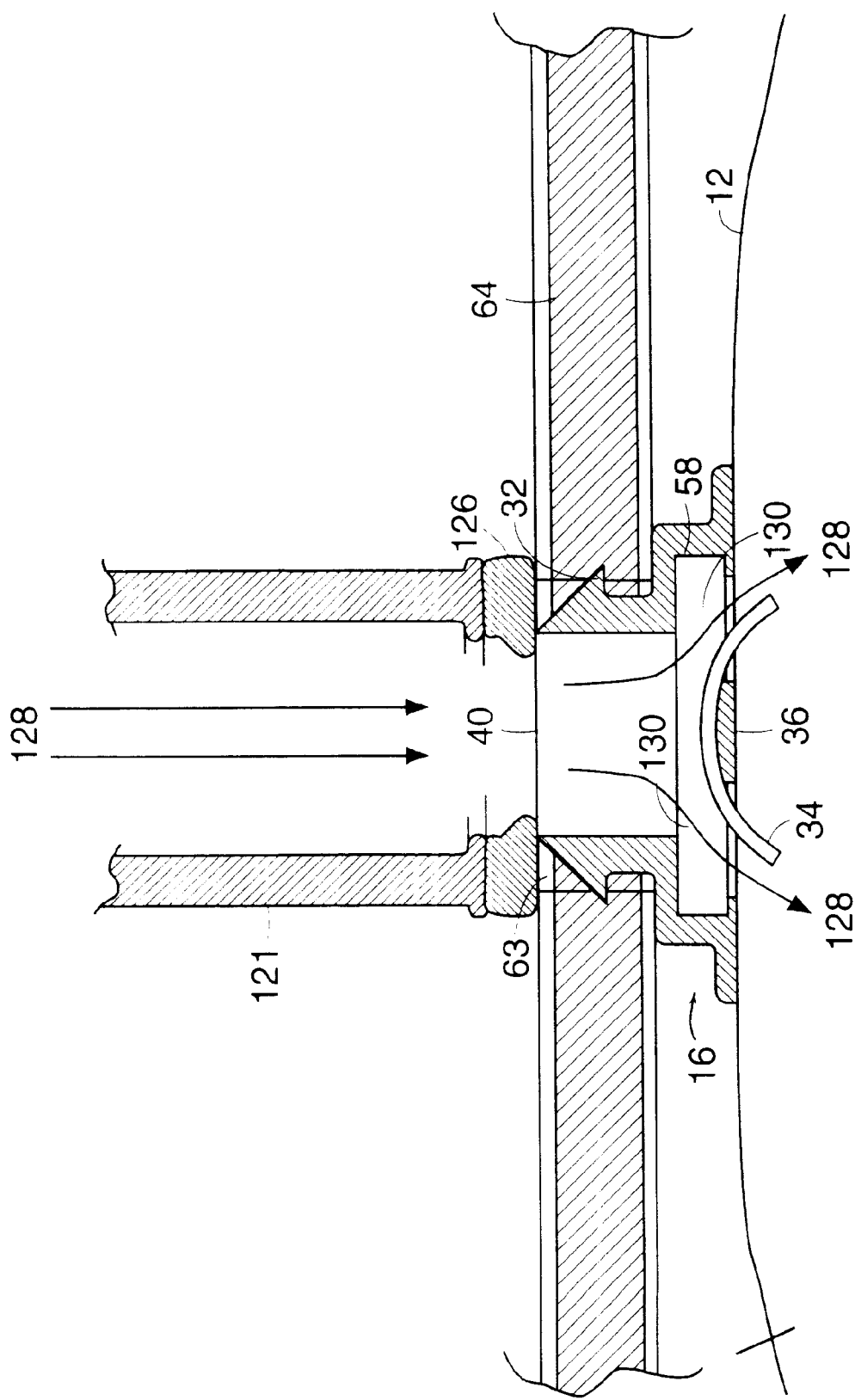
FIG. 4B is a side cross-sectional view of the rigid valve assembly of the dunnage bag of FIG. 1 during inflation of the bag.

During inflation, as shown in FIG. 4B, end 126 of fill nozzle 121 sealably engages with entrance opening 40 of rigid valve assembly 16. Air flows in the direction of arrows 128 from fill nozzle 121 through rigid valve assembly 16 into flexible bag 12. The force of the flowing air folds diaphragm 34 around retainer post 36 to create a passageway 130 through rigid valve assembly 16. After inflation, diaphragm 34 snaps back against surface 56 of housing 32 because of the spring behavior of diaphragm 34 and the internal pressure inside flexible bag 12.

Figure 5:
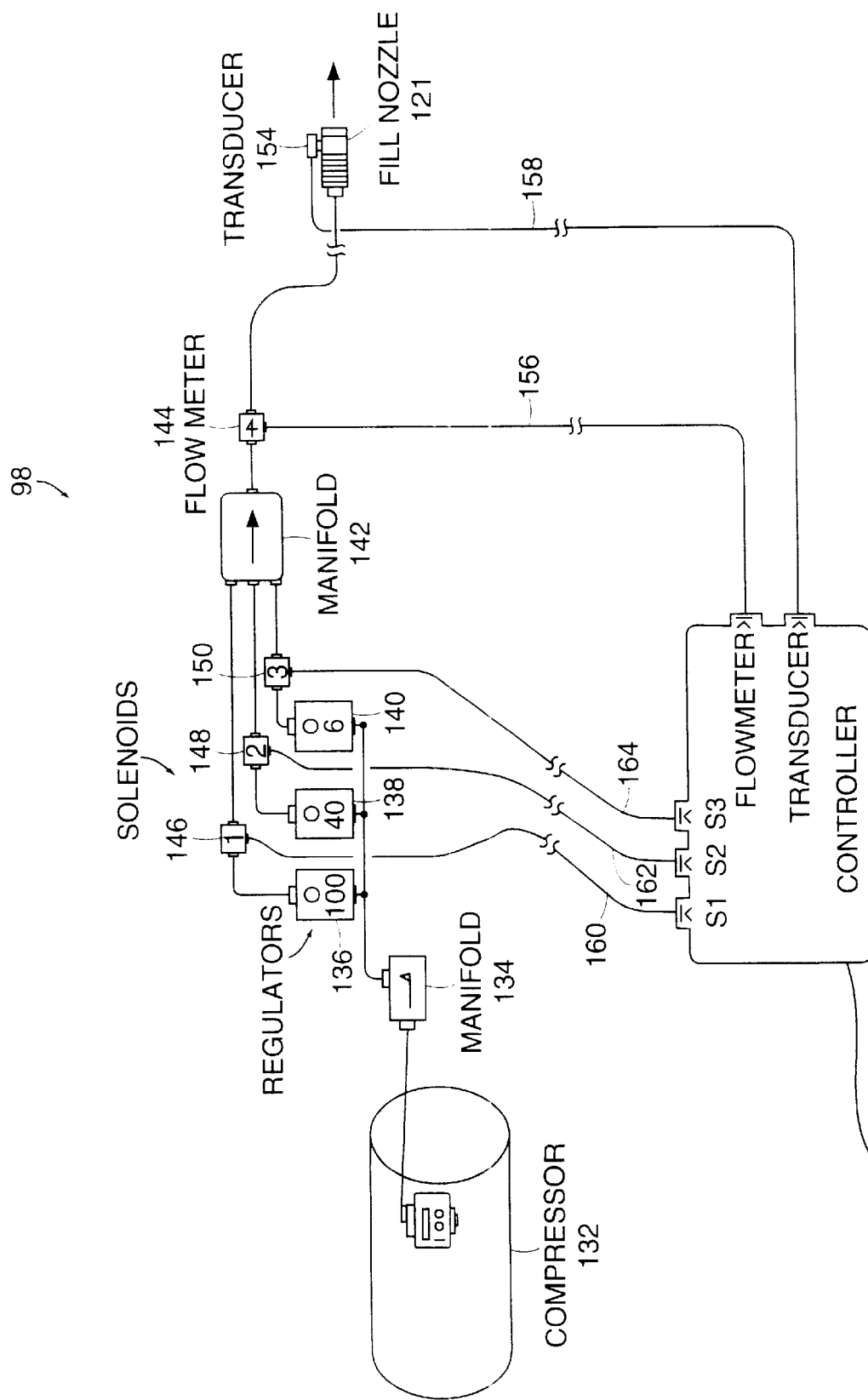
FIG. 5 is a block diagram of an inflating system for the packaging system of FIG. 4A.

Inflating system 98 is shown in greater detail in FIG. 5. Fill nozzle 121 of inflating system 98 is connected to a compressor 132 which supplies pressurized air for inflating dunnage bag 10. The pressurized air from compressor 132 is directed through a manifold 134 to three pressure regulators 136, 138 and 140 which reduce the supply pressure to 100 psi, 40 psi, and 6 psi, respectively. Regulators 136, 138 and 140 are connected in turn to a second manifold 142 which distributes the air through a flow meter 144 to fill nozzle 121. A flow meter 144 monitors the flow rate of air to fill nozzle 121. Three solenoids 146, 148, and 150 are located in the lines connecting manifold 142 and regulators 136, 138, and 140, respectively. Solenoids 146, 148, 150 and flow meter 144 are electrically connected to a controller 152, for example, a programmable logic controller. Controller 152 through the controlling of the operation and sequencing of solenoids 146, 148 and 150 controls the inflation sequence of the bag. A pressure transducer 154 which monitors the pressure within dunnage bag 10 is positioned near fill nozzle 121 and is electrically connected to controller 152. During inflation of dunnage bag 10, feedback signals from flow meter 144 and pressure transducer 154 are transmitted via a pair of control lines 156 and 158, respectively, to controller 152. When a desired pressure is detected, controller 152 terminates the inflation sequence. Typically, for a 0.3 ft$^3$ dunnage bag, air at 100 psi is first supplied for about 500 msec at a flow rate of about 600 liters/min, then at 40 psi supplied for about 500 msec at about 325 liters/min, and finally at 6 psi supplied for about 1 sec at a flow rate of about 100 liters/min. Thus, the total inflation process takes about 2 seconds.

In operation, container 66 is transported by conveyor 92 towards station 97. Prior to arrival at station 97, an operator places articles 80 inside container 66. Subsequently, an operator places dunnage bag 10 inside container 66 and mounts rigid valve assembly 16 in hole 63 of wall 64 of container 66 (FIG. 3). Alternatively, the operator can first place dunnage bag 10 inside container 66, and then place the articles on top of the bag. The operator then folds minor flaps 107 and major flaps 108 to a closed position. The subsequent packaging steps are fully automated. Belt drivers 100, 101 receive container 66 and pull the container through station 97. As container 66 advances through station 97, tape applying device 116 is activated by the pneumatic controller and applies a strip of tape along the top of container 66 thereby sealing gap 117 between major flaps 108 previously folded by the operator. A sensor (not shown) detects leading edge 105 of container 66, and then after a predetermined time the pneumatic controller (not shown) actuates arm 120. Arm 120 pushes fill nozzle 121 against rigid valve assembly 16, and the inflation process begins. Fill nozzle 121 moves with container 66 while dunnage bag 10 is being inflated. The entire inflation process takes about 3 seconds. After dunnage bag 10 is inflated, fill nozzle 121 is pneumatically pulled from rigid valve assembly 16, and arm 120 is pneumatically returned to its initial position. Packaging system 90 is capable of packaging about 15 containers per minute.

In other embodiments of the packaging system, controller 152 can be a CPU running software instead of a programmable logic controller. Each of taper 96 and inflating system 98 can be a stand alone system. Thus the dunnage bag may be inflated prior to or after the sealing of the container is completed. Solenoids 146, 148, 150 can each be activated for a predetermined time. The location of rigid valve assembly 16 when it is mounted in opening 63 can be determined by a pattern recognition system. In addition to the sensor used to detect the leading edge of the container, there can be an additional sensor to detect the trailing edge of the container so that the width of the container can be determined. The known width then enables the packaging system to determine the time at which arm 120 forces fill nozzle 121 against the rigid valve assembly for containers of various widths. In other embodiments, the pitch and amplitude of the noise generated by the flow of air through the fill nozzle can be used to monitor the inflation sequence.

Figure 6:
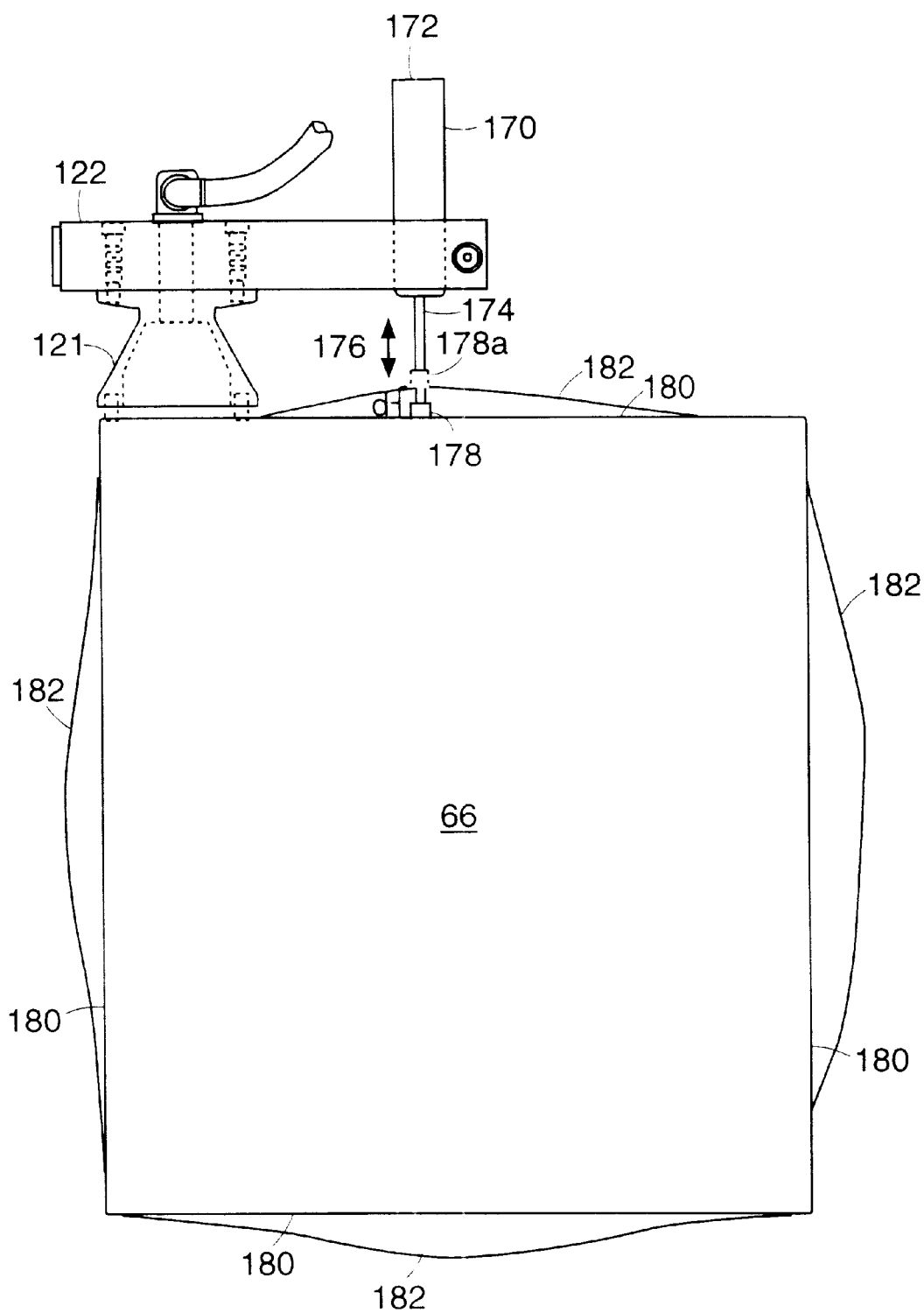
FIG. 6 is a partial top view of an alternative embodiment of a packaging system incorporating a box swell detector.

In another embodiment of the packaging system, as shown in FIG. 6, housing 122 holds a swell detector 170. Swell detector 170 is typically a linear transducer which includes a body 172, and a rod 174 that moves in and out of body 172 as indicated by double arrows 176. An enlarged head 178 is attached to an end of rod 174.

When container 66 arrives in station 94 (FIG. 4A), swell detector 170 pushes enlarged head 178 against the wall of container 66. Before the container is inflated, the walls of the container are substantially flat as indicated by the straight lines 180. While the dunnage bag within the container is being inflated, the walls of the container swell outward as indicated by the curved lines 182. The deflection of the wall on which enlarged head 178 abuts against causes enlarged head 178 to move a distance d. This distance is correlated with the pressure within the bag. When a desired pressure is detected, the inflation sequence is terminated. If the distance d decreases after the completion of the inflation sequence, then it is likely that the dunnage bag has a leak. In other words, the operator can monitor the distance d after the inflation sequence and determine if there is a leak in the bag.

Figure 7A:
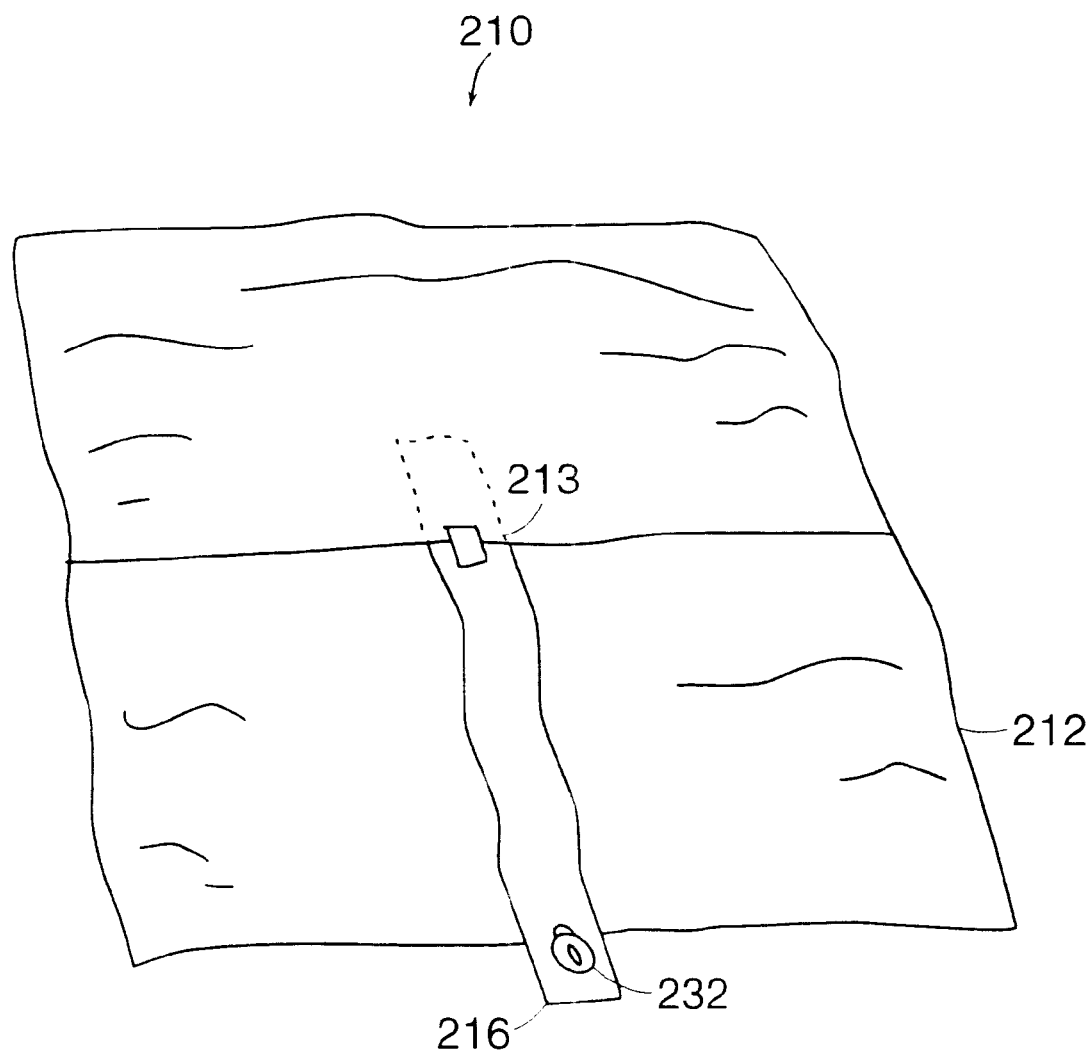
FIG. 7A is an illustration of alternative embodiment of a dunnage bag incorporating a flexible valve assembly.

Other embodiments of the dunnage bag differ slightly from the embodiment described above. For example, another embodiment shown in FIG. 7A as a dunnage bag 210 includes a flexible valve assembly 216 partially inserted into a flexible bag 212 near a center portion 213 of flexible bag 212. Flexible valve assembly 216 includes a rigid collar 232 for mounting in an opening in a wall of a container similar to the device discussed with reference to FIG. 2D. Rigid collar 232 defines an opening 240 into the flexible valve for inflating flexible bag 212. Flexible valve assembly 232 enables flexible bag 212 to conform to the void regions in container 66 carrying articles 80 for shipment without straining the region near center portion 213 when flexible bag 212 is inflated. Flexible bag 212 may include a pleat similar to that described with reference to FIG. 1.

Figure 7B:
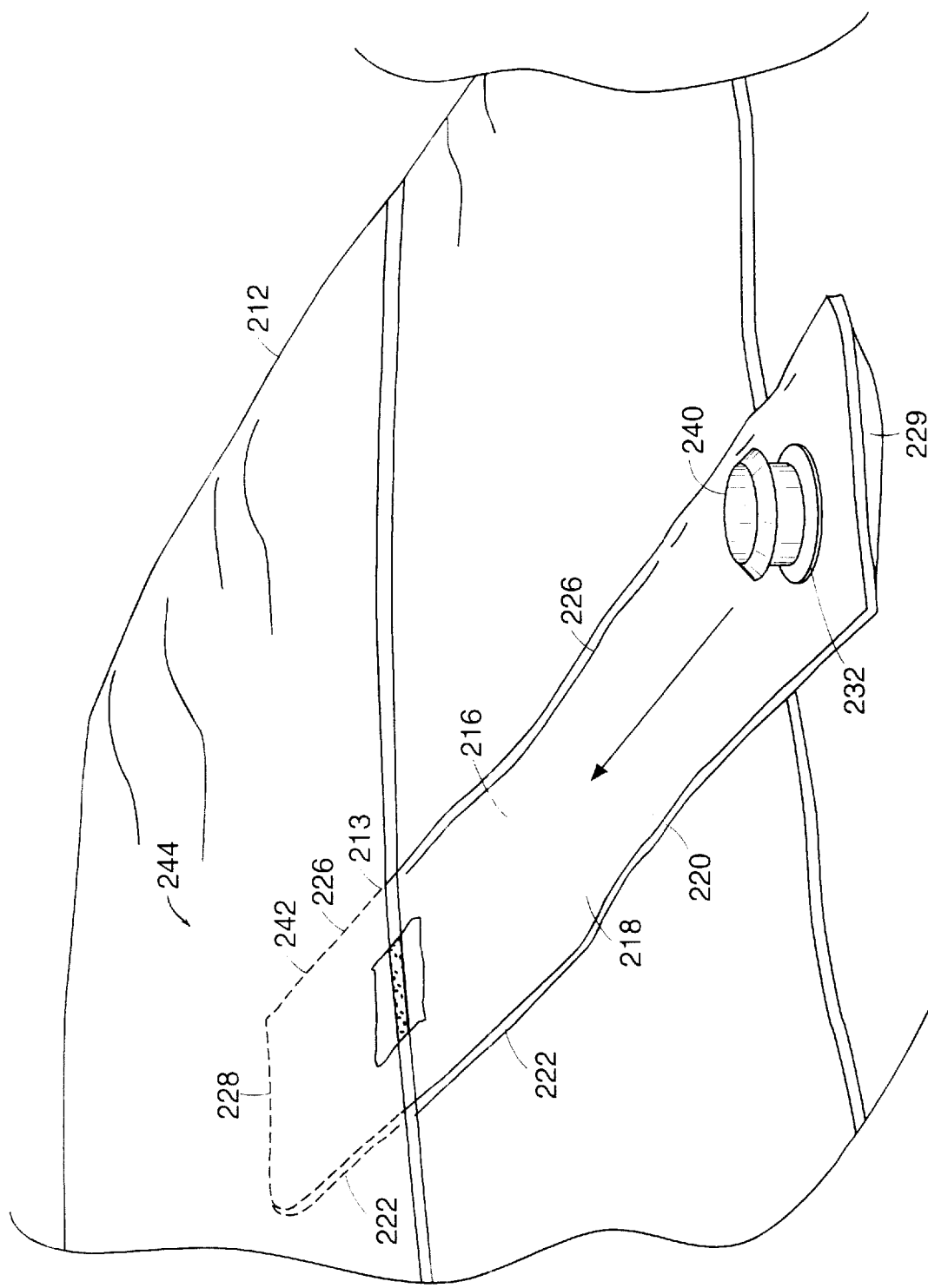
FIG. 7B is a close-up view of the flexible valve assembly of the dunnage bag of FIG. 6A.

Flexible valve assembly 216 is shown in greater detail in FIG. 7B. Flexible valve assembly 216 includes two opposed sheets 218 and 220 sealed along three edges 222, 224 and 226. Alternatively, flexible valve assembly 216 can be made from a single sheet and folded along one edge, for example edge 222, and sealed along the other two edges 224 and 226. Flexible valve assembly 216 has an open end 228 so that a passageway is defined from opening 240 of rigid collar 232 to the inside of flexible bag 212. Flexible valve 216 is bonded to flexible bag 212 near center portion 213 of the bag so that an inner portion 242 of flexible bag 212 resides inside the bag. When dunnage bag 210 is inflated, sides 218 and 220 of portion 242 are urged together by the internal pressure of the dunnage bag thereby creating a seal and preventing air from escaping.

Figure 7C:
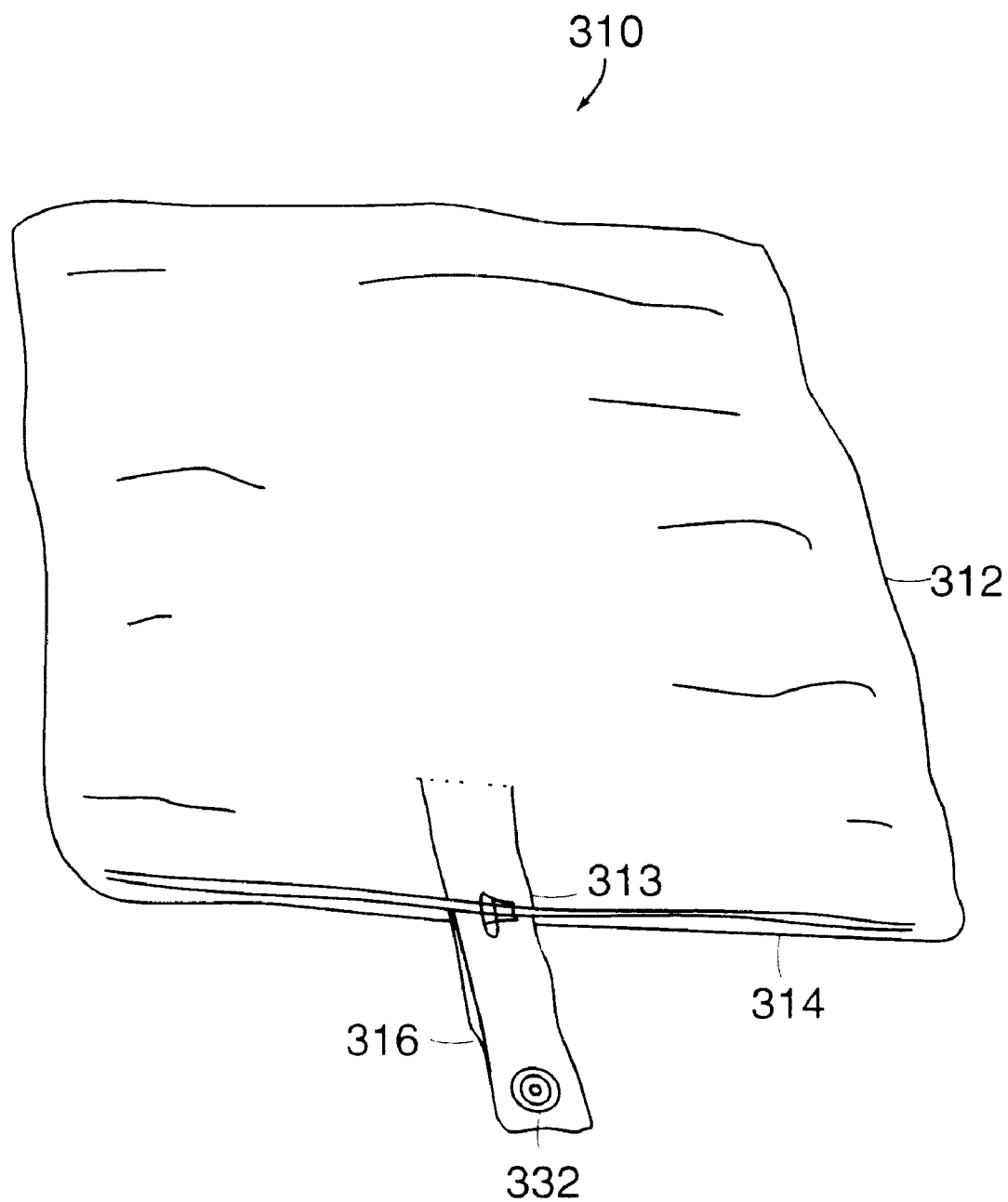
FIG. 7C is an illustration of another alternative embodiment of a dunnage bag incorporating a flexible valve assembly.

Yet another embodiment shown in FIG. 7C as a dunnage bag 310 includes a flexible valve assembly 316 partially inserted into a flexible bag 312 at an attachment region 313. Flexible valve assembly 316 also includes a rigid collar 332 which provides an opening into the flexible valve assembly. The construction and operation of flexible valve assembly 316 is similar in most respects to flexible valve assembly 216 described with reference to FIGS. 7A and 7B except for the location of the attachment region of the valve assembly to the flexible bag. Attachment region 313 is located on an edge 314 of flexible bag 312. Since attachment region 313 is typically near the location at which rigid collar 332 is mounted in an opening of a wall of a container, the amount of material required to form rigid valve assembly 316 is minimized.

In another embodiment, shown in FIG. 8, a dunnage bag 360 includes a flexible valve assembly 362 partially inserted in a flexible bag 364. Flexible valve assembly 362 does not have a rigid collar, but the sealing of flexible valve assembly 362 is similar to that of the valve assembly described with reference to FIGS. 7A–7B. An outer portion 365 of flexible valve assembly 362 includes two flaps 366, 368. Each of flaps 366, 368 has an adhesive 370 applied to a respective outer surface 372, 374. When flaps 366, 368 are spread apart, the flaps define an opening 376.

To mount flexible valve assembly 362 in a wall of a container, the operator first inserts the valve assembly from the inside of the container through a slit in the wall. Next, the operator spreads flaps 366, 368 apart and pushes the flaps against the wall to cause the adhesive to adhere the flaps to the wall. During the inflation sequence, the inflating system supplies pressurized air to opening 376 to inflate dunnage bag 360.

Figure 9:
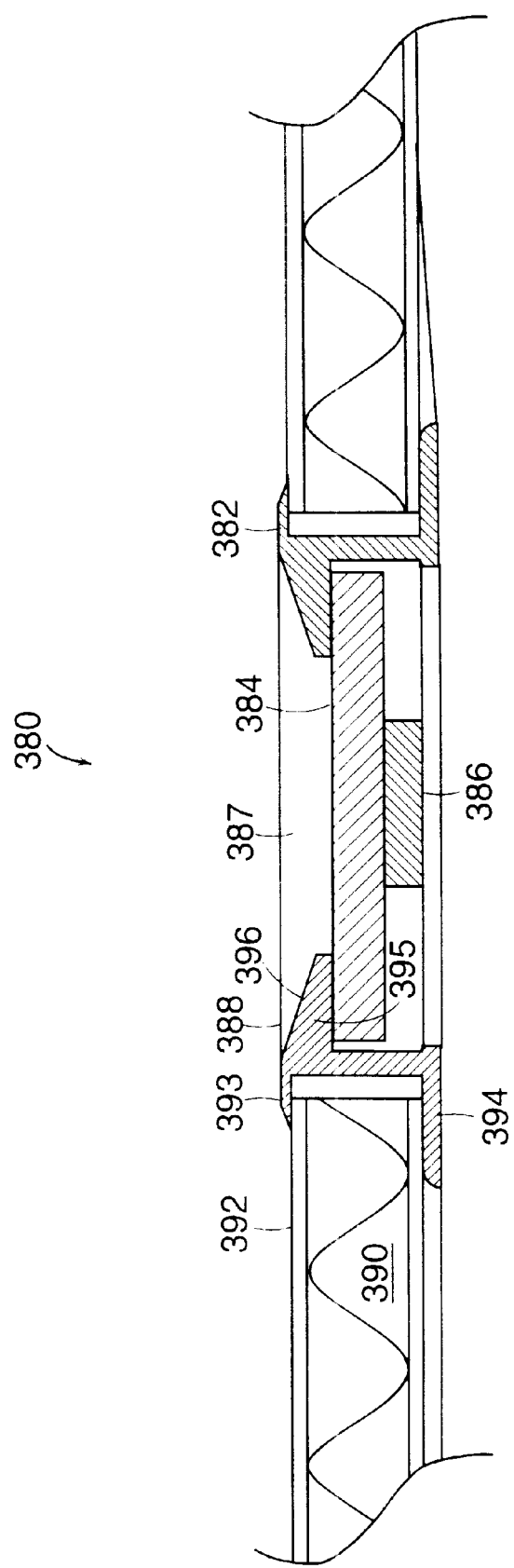
FIG. 9 is an illustration of an alternative embodiment of a rigid valve assembly.

Another embodiment shown in FIG. 9 as a rigid valve assembly 380 includes a housing 382, a circular diaphragm 384, and a retainer post 386 which secures diaphragm 384 within housing 382. The operation of rigid valve assembly 380 is similar to valve assembly 16 described with reference to FIGS. 2A–2D. Housing 382 defines a bore 386 with an entrance opening 388. Housing 382 includes an outwardly extending rim 393 and an outwardly extending shoulder 394 spaced from rim 393. An inwardly extending rim 395 of housing 382 includes a tapered surface 396.

When rigid valve assembly 380 is mounted in an opening of a wall 390, entrance opening 388 protrudes beyond an outer surface 392 of wall 390. In addition, shoulder 394 abuts against an inner surface 397 of wall 390, and rim 393 abuts against outer surface 392 to hold rigid valve assembly 380 in the opening of wall 390.

Figure 10:
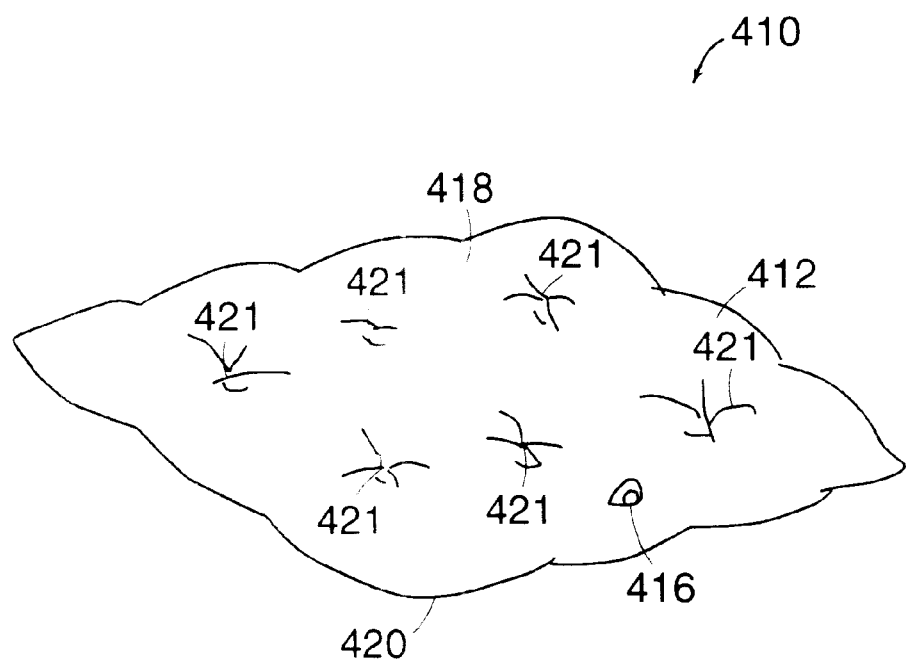
FIG. 10 is an illustration of an alternative embodiment of a dunnage bag of quilted construction.

Still another embodiment shown in FIG. 10 as a dunnage bag 410 includes a rigid valve assembly 416 connected to a flexible bag 412 having two opposed sides 418 and 420. Sides 418 and 420 are tacked together at several points 421 such that flexible bag 412 has a quilted construction. Thus opposed sides 418 and 420 remain substantially parallel to each other when flexible bag 412 is inflated. Rigid valve assembly 416 is similar to the valve assembly discussed with reference to FIGS. 2A–D. Dunnage bag 410, however, can include any one of the valve assemblies described with reference to FIGS. 7A–9. When dunnage bag 410 is placed at the bottom of a container and inflated, dunnage bag 410 acts as level quilted pad upon which an article can rest without rolling towards a wall of the container. Another dunnage bag, for example dunnage bag 10 (FIG. 1), can then be placed on top of the article without an operator having to hold the article in the center of dunnage bag 410.

Figure 11:
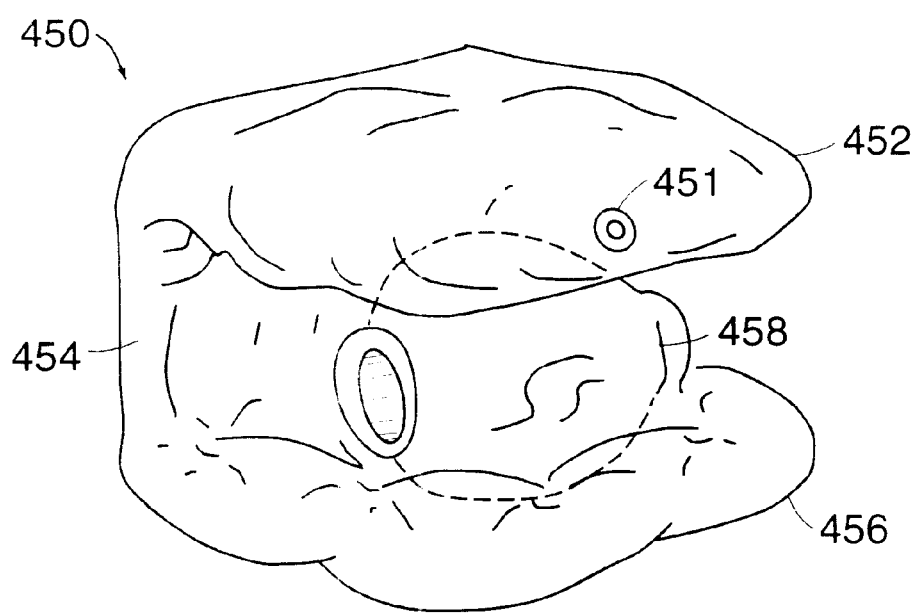
FIG. 11 is an illustration of an alternative embodiment of a composite dunnage bag.

In another embodiment shown in FIG. 11, a composite dunnage bag 450 includes a rigid valve assembly 451, and has the features of both dunnage bag 410 (FIG. 10) and dunnage bag 10 (FIG. 1). Dunnage bag 450 includes a portion 452 joined by a mid portion 454 to another portion 456. Portion 452 has a substantially smooth outer surface, and portion 456 has a quilted construction similar to the dunnage bag described with reference to FIG. 10. In use, the operator places dunnage bag 450 in the container such that portion 456 rests on the bottom of the container. Next, the operator places an article 458 on top of portion 456 and then folds portion 452 over the article. The remaining packaging sequence is identical to that described above with reference to FIGS. 4A–5.

In yet another embodiment shown in FIG. 12A as a dunnage bag 510 includes a flexible bag 512 which has multiple protrusions 526 extending outwardly from a surface 528 of flexible bag 512. Dunnage bag 510 also includes a rigid valve assembly 516 similar to rigid valve assembly 16 discussed previously with reference to FIGS. 2A–2D. Dunnage bag 510, as well as dunnage bag 450 (FIG. 11) can be used with any one of the valve assemblies described with reference to FIGS. 7A–9.

Figure 12B:
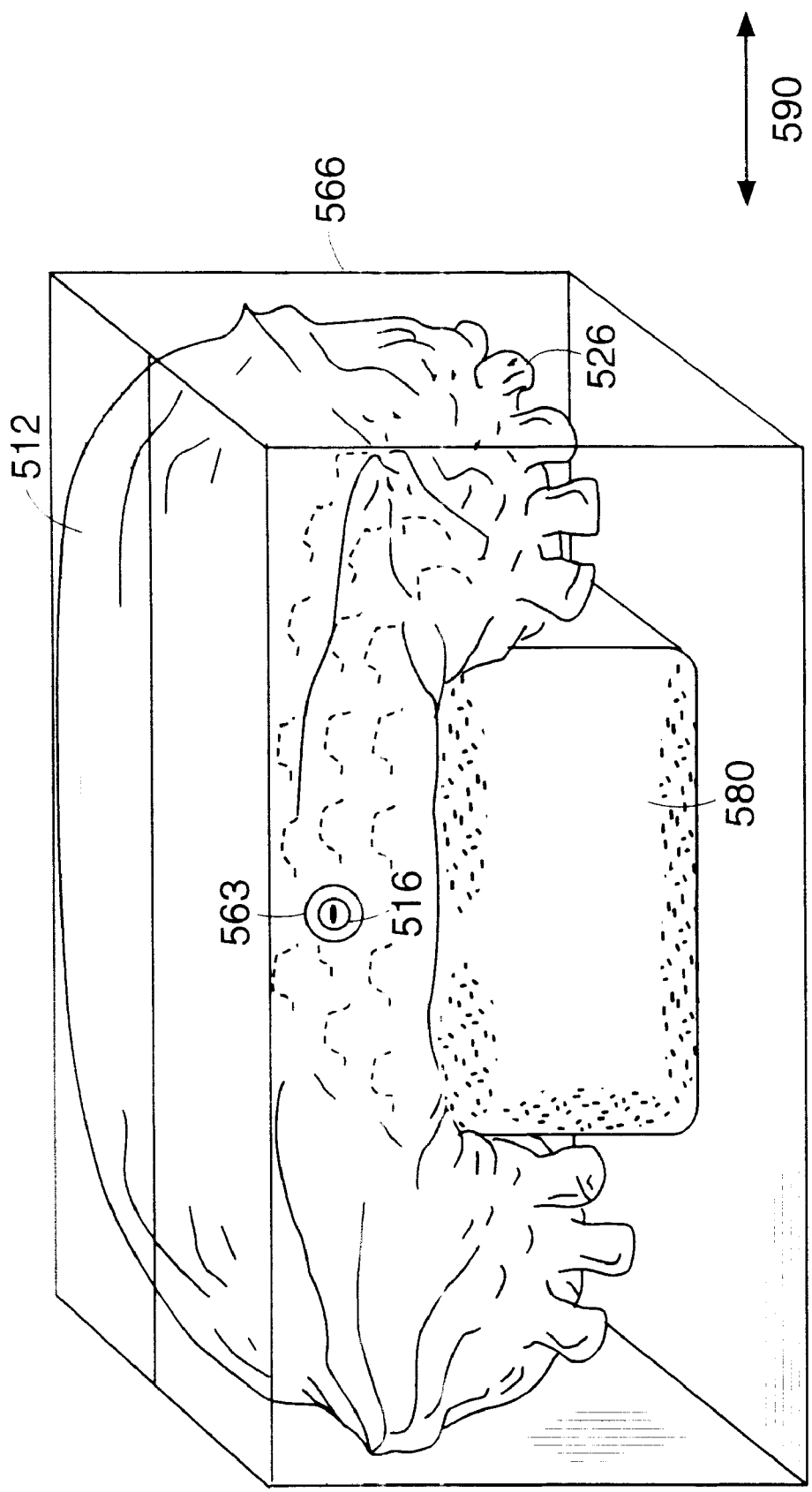
FIG. 12B is an illustration of the dunnage bag of FIG. 12A in use in a container.

Dunnage bag 510 in use is shown in FIG. 12B where rigid valve assembly 516 of dunnage bag 510 is mounted in an opening 563 of container 566 which carries articles 580. When flexible bag 512 is inflated, protrusions 526 effectively grab article 580 by expanding into the space about article 580. Protrusions 526 prevent article 580 from shifting when side loads are applied to container 566 in the direction of arrows 590.

In other embodiments, any one of the flexible bags described above may be adhered to the interior of the container, for example, with an adhesive. Thus the combination of the flexible bag and container would form a single integrated dunnage bag.

Figure 13:
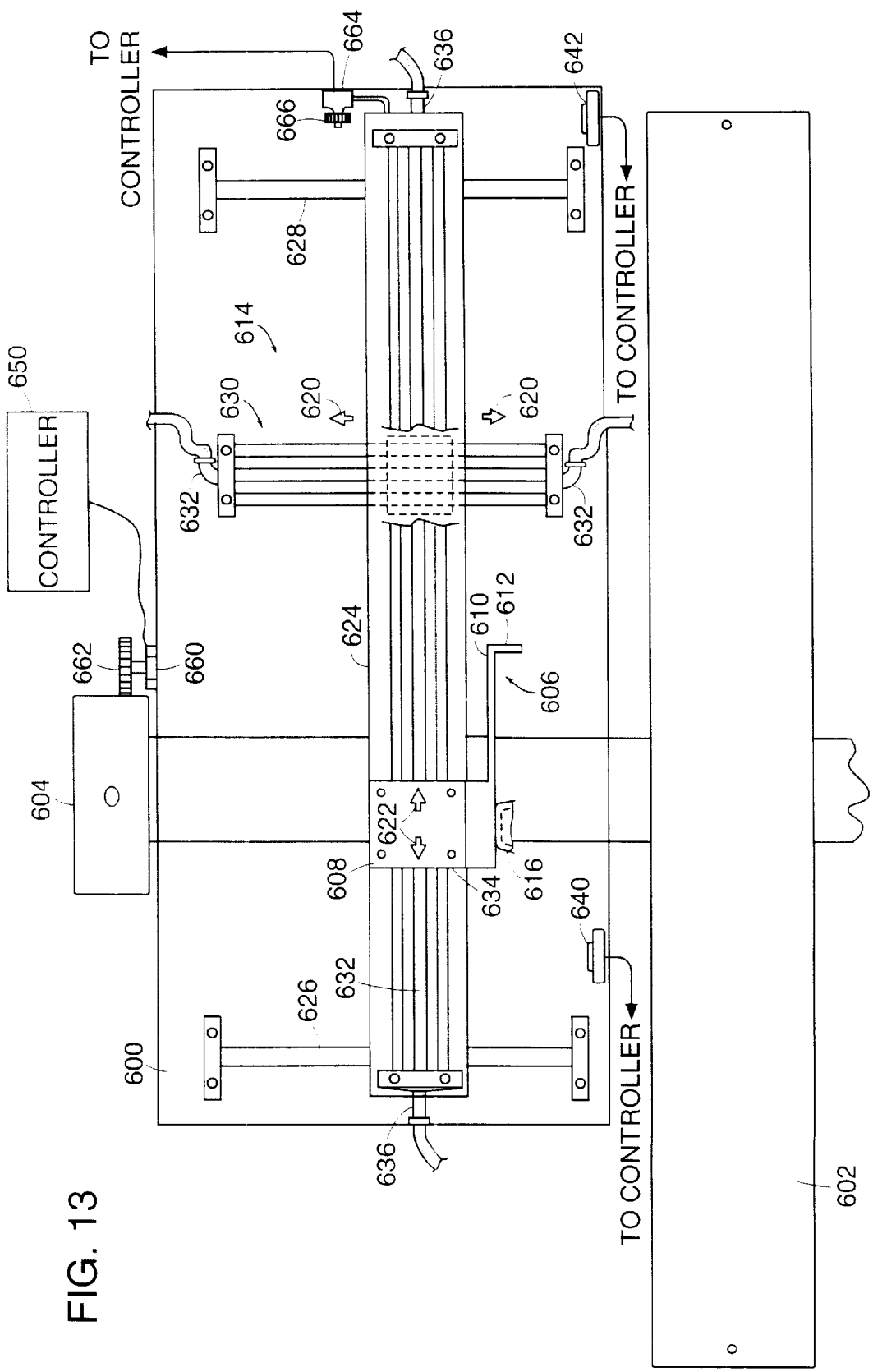
FIG. 13 is a view of an embodiment of an inflator mechanism that is incorpoated into a taping machine.

A further embodiment of the inflator mechanism is shown in FIG. 13, which represents a view looking up at the bottom of the mechanism. It can be incorporated as part of the taper, as previously described, or it can be mounted on a separate system that stands alone or is mounted relative the taper system, either before it or after it. The illustrated embodiment is shown as part of a taper system and is located on the system such that taping and inflation take place concurrently.

The inflator mechanism is mounted on a base plate 600 which is affixed to the taper head assembly 602. As previously described, the taper head moves up and down on two columns 604, one of which is shown at the top of FIG. 13. As the taper head moves up and down, the inflator mechanism moves up and down along with it. The inflator mechanism includes an alignment guide 606 onto which an inflator head 608 is mounted. Alignment guide 606, which is an L-shaped bracket having a long arm 610 and a short arm 612, is mounted on an air operated positioning mechanism 614 which is, in turn, mounted onto base plate 600. The inflation nozzle 616 is positioned in long arm 610 at a distance from short arm 612 that is equal to the distance that the rigid valve is mounted from the edge of the box or carton in which the inflatable bag is inserted. Also, the vertical distance that alignment guide 606 is located down from the taper is equal to the distance that the rigid valve is located down from the top of the box. Thus, during operation, when long arm 610 comes to rest against the side of the box or carton and short arm 612 comes to rest against the front the box, thus automatically aligns the inflation nozzle 616 with the rigid valve in the box.

Positioning mechanism 614 moves alignment guide 606 in two orthogonal directions, namely, from side to side, as depicted by arrows 620 and forward and backward, as depicted by arrows 622. Positioning mechanism 614 includes an actuator plate 624 supported on either end by two bearing shafts 626 and 628 which enable actuator plate 624 to move from side to side. An air operated solenoid, in this case, a rodless cylinder 630 with air supply connections 632 at either end, is mounted on base plate 600 between the two bearing shafts 626 and 628 and serves to move actuator plate 624, and thus the alignment guide 606, back and forth on bearing shafts 626 and 628. Actuator plate 624 supports a second rodless cylinder 632 on which a shuttle block 634 is mounted. Alignment guide 606 and inflator head 608 are mounted on shuttle block 634. This second rodless cylinder 632, which also has air supply connections 636 on either end, serves to move the shuttle block 634 and alignment guide 606 forward and backward.

Photoeyes 640 and 642 are mounted on base plate 600 and provide signals to a controller 650 which operates rodless cylinders 630 and 632, the air inflation process, and the conveyor which moves the box through the taper machine. Photoeyes 640 detects when the box has entered the taper and causes controller 650 to begin moving alignment guide 606 into position to begin the inflation process. Photoeye 642 detects when the air inflator, which is pushed up against the box, has come to the end of its travel and controller 650 responds to this signal by causing the conveyor to temporarily halt until the air fill process is completed, if it has not already finished. If the inflation process has completed before the box reaches photoeye 642, the controller does not stop the conveyor but allows the box tombe carried out of the system.

Base plate 606 also has two digital encoders 660 and 664 affixed to it. Encoder 660, which is also referred to as vertical encoder 660, is affixed to the edge of base plate 600 near vertical support column 604 and includes a wheel 662 that rides against that column. It generates a signal that indicates how tall the box is and that is also a measure of the change in height, i.e., the degree of top bulge, during the inflation operation. Encoder 664, which is also referred to as horizontal encoder 664, is affixed to one end of actuator plate 624 and includes a wheel 666 that rides against the surface of base plate 600. It generates a signal that indicates how wide the box is and that is also a measure of the change in box width, i.e., the degree of side bulge, during the inflation operation.

Controller 650, which may be a general computer (e.g. a PC) running special software or a dedicated programmed processor, controls the operation of the taper and the inflation mechanism. Controller 650 may be two or more processors working in cooperation, as might be the case in a commercially obtained taper that has been retrofitted with the automatic inflation mechanism or it might be a single processor as in the case of equipment that is especially designed to integrate the multiple functionality described herein.

Controller 650 implements an autofill algorithm which enables the user to establish the thresholds at which the inflation operation is determined to be complete. Each threshold is a value for the amount of bulge in a corresponding side of the box (or a combination of sides) that indicates inflatoin is complete. In the described embodiment, there are three thresholds, namely, a vertical bulge threshold, $V_{th}$; a horizontal bulge threshold, $H_{th}$; and a combined bulge threshold $C_{th}$. In this case, the combined threshold corresponds to the sum of the measured bulges in both the horizontal and vertical directions and it is likely to be different from the sum of $V_{th}$ and $H_{th}$. As a practical matter, the algorithm can be set to use any one or more of these thresholds to detect the completion of the inflation process.

The user can select a training mode in the algorithm during which the user observes the bulge which occurs when inflation is taking place, and selects the desired degree of bulge which the operator believes to be an accurate indicator of complete inflation. When the operator senses that inflation is complete as indicated by the bulge of a specific side of the box side and indicates that to the controller, the controller stores the measured bulge value as derived from the corresponding encoder as a threshold value. By doing this for both of the top of the box and the side of the box, the operator is able to set the values for both $V_{th}$ and $H_{th}$. These values are stored in a table that associates them with box size as also measured by the encoders. As different boxes are processed through the system, the operator in this way can build a table of threshold values as a function of box size, and these values can then later be used during actual inflation operations. More specifically, when the operator sends a box through the taper, the machine detects the size of the box and from the stored table of thresholds selects and applies the thresholds associated with that box size.

As an alternative way to train the thresholds that are to be used, the system can use initial values and then permit the operator to increment the initial values, either upward or downward, unit the operator achieves the best value for indicating full inflation.

The sequence of steps that are performed are illustrated in FIGS. 14a–e. First, a detector on the taper detects the box 900 as the conveyor moves it into the taping system. In response to detecting the presence of the box, the controller causes the taper head to move down onto the top of the box. When it reaches the top of the box the taper stops and the controller is able to determine from the signal that has been generated by vertical encoder what the height of the box is, thereby automatically setting the first threshold value for the inflation detection algorithm. As the conveyor moves the box forward, the first photoeye on the base plate detects the front edge of the box as it passes by. In response to that signal, the controller actuates the first actuator (i.e., rodless cylinder 630 in FIG. 13) causing it to push alignment guide 606 up against the side of box 700 (FIG. 14b). The signal from horizontal encoder enables the controller to determine the width of the box, which establishes a second threshold for the inflation process.

A short time after the alignment guide has contacted the side of the box (e.g. 100 ms), the second actuator moves the alignment guide backwards until the short arm of the alignment guide contacts the front of the box (FIG. 14c). The delay is set to be long enough to permit the box to moved forward sufficiently far so that the alignment guide whe pulled backwards will contact the front of the box. At the end of the step depicted in FIG. 14c, the inflator nozzle is aligned with and pressed up against rigid valve 16. The controller then begins the inflation process by flowing air through the inflation nozzle into the inflation bag. While the bag is inflating the box continues to move forward also pulling the alignment guide forward and thereby keeping the inflation nozzle aligned with the rigid valve. During the inflation process, the controller, by monitoring the outputs of the vertical and horizontal encoders, measures the bulge of the box as the dunnage bag is inflated. The controller repeatedly checks the measured bulge against the thresholds that apply to that box size. If any of the thresholds are reached, the controller terminates the inflation process, pulls the alignment guide away from the box (FIG. 14d), and returns the alignment guide back to its home position (FIG. 14e). While the inflation is taking place, the controller also checks whether the box has reached the second photoeye. If the box reaches the second photoeye before inflation is complete, the controller stops the conveyor so that the box can remain at a fixed position until the controller detects that fill is complete, at which time the alignment guide is pulled back to its home position as described above and the conveyor is restarted to move the box out of the equipment.

Rather than pulling the alignment guide away from the box immediately upon reching complete inflation, it can also be left there for a short period of time (e.g. 100–200 msec) to enable the sensors to detect any deflation that would indicate a leak. If such a leak is detected, the controller alerts the operator of a possible defective bag so the opperator can take corrective action.

Note that the above described embodiments are meant to merely be illustrative. It should be understood that alternative components exist which can be substituted for those described herein to perform generally similar functions. For example, though we have used digital encoders, any device or transducer that can measure length, position, and/or amount of movement can be substituted for the encoders. Similraly, though we have decribed using photoeyes to detect the location of objects in the system, any detector, optical or otherwise, can be used that can perform that function.

Other embodiments are within the scope of the following claims.

What is claimed is:

1. A method of inflating a dunnage bag in a box, said method comprising:
    inflating the dunnage bag;
    with one or more sensors, monitoring deflection of at least two surfaces of the box while inflating the dunnage bag;
    upon detecting through monitoring that deflection of either of said at least two surfaces reaches a corresponding threshold, automatically terminating inflating of the box.

2. The method of claim 1 wherein the said at least two surfaces include the top of the box and one side of the box.

3. The method of claim 2 further comprising measuring a height of the box and selecting a threshold on the basis of the height measurement, wherein the selected threshold is said corresponding threshold.

4. The method of claim 3, further comprising storing a table which associates a plurality of heights with a corresponding plurality of thresholds and wherein selecting the threshold comprises referencing said table.

5. An inflation system for inflating a dunnage bag in a box, wherein the dunnage bag has a valve mounted in the side of the box, said system comprising:
    a conveyor which moves the box through the system;
    an inflation nozzle;
    an alignment guide which is attached to the inflation nozzle and which has at least two alignment surfaces, each for a corresponding different surface of said box; and
    a positioning mechanism which controls movement of the alignment guide and which during operaton automatically moves the alignment guide into contact with the box so that the at least two alignment surfaces are in contact with their corresponding surfaces of the box thereby aligning the inflation nozzle with the valve in the box.

6. The inflation system of claim 5 wherein the alignment guide is a L-shaped member having a first arm defining one of said at least two alignment surfaces and a second arm defining another one of said at least two alignment surfaces.

7. An automatic inflation system for inflating a dunnage bag in a box, wherein the dunnage bag has a valve mounted in the side of the box, said system comprising:
    an inflation nozzle through which gas is flowed into the dunnage bag through the valve;
    a controller which controls the inflation process;
    a vertical bulge detector which during operation generates a first signal that provides a measure of bulge of the top of the box; and
    a horizontal bulge detector which during operation generates a second signal that provides a measure of bulge of a side of the box;
    wherein the controller receives signals from the vertical and horizontal bulge detectors and is programmed to control the inflation process in response thereto.

8. The system of claim 7 wherein the controller stores a first threshold and a second threshold and is programmed to perform the operations of:

comparing the measure of the bulge of the top surface to the first threshold;

comparing the measure of the bulge of the the side surface to the second threshold; and if the either measure of bulge becomes at least as large as the corresponding threshold, terminating the inflation process.

9. The system of claim 8 wherein the controller stores a table mapping box sizes to first and second threshold values, and wherein the controller is further programmed to perform the operations of:

from the signals of at least one of the horizontal and vertical bulge detectors, determine a box size; and selecting values for the first and second thresholds from the table based on the box size.

10. The system of claim 7 wherein the controller stores a first threshold, a second threshold and a third threshold and is programmed to perform the operations of:

comparing the measure of the bulge of the top surface to the first threshold;

comparing the measure of the bulge of the side surface to the second threshold;

combining the measures of bulge of the top and side surfaces to generate a combined measure of bulge; and if any of the measures of bulge becomes at least as large as the corresponding threshold, terminating the inflation process.

11. A method of inflating a dunnage bag in a box, said method comprising:

inflating the dunnage bag;

with a sensor monitoring deflection of a selected surface of the box while inflating the dunnage bag;

upon detecting through monitoring with the sensor that deflection of the selected surface reaches a preselected threshold, automatically terminating inflating of the box.

12. The method of claim 11 wherein the step of using an instrument involves using a linear transducer.

13. The method of claim 11 wherein said selected surface of the box is a top surface of the box.

14. The method of claim 11 wherein said selected surface of the box is a side surface of the box.

* * * * *